Oct. 4, 1966   H. BLASZKOWSKI   3,277,267
METHOD AND APPARATUS FOR TREATING ELECTRICALLY
CONDUCTIVE SURFACES
Filed Sept. 20, 1965   5 Sheets-Sheet 1
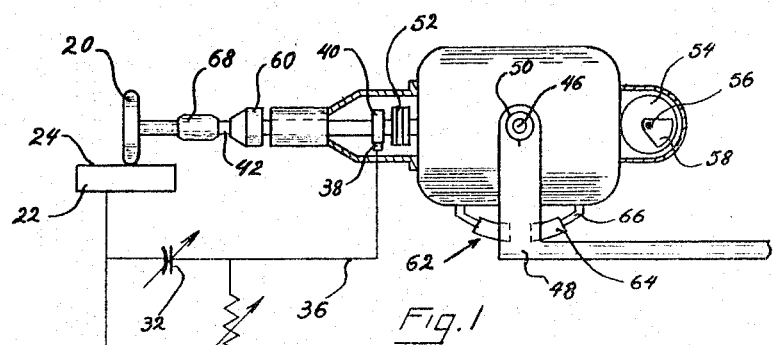
Fig. 1
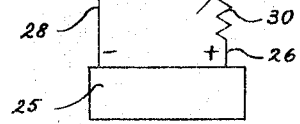
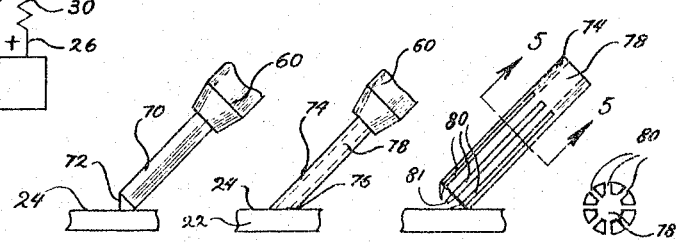
Fig. 2   Fig. 3   Fig. 4   Fig. 5
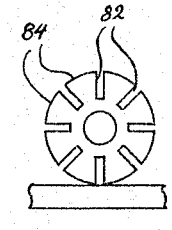
Fig. 6
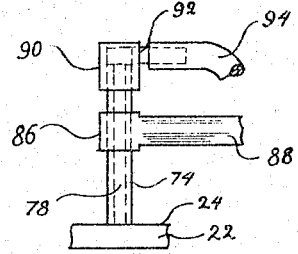
Fig. 7
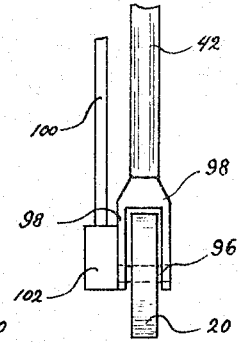
Fig. 8
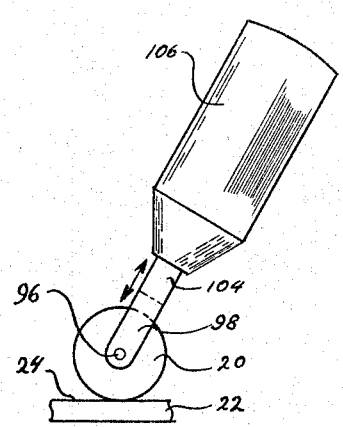
Fig. 9
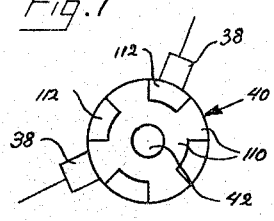
Fig. 10
INVENTOR.
HENRY BLASZKOWSKI
BY
Barnard, McGlynn & Leising
ATTORNEYS

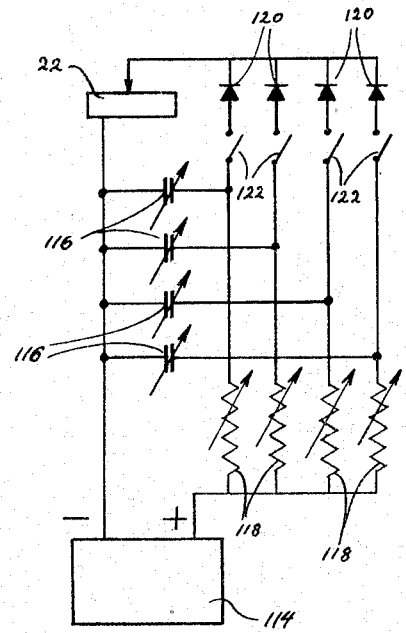
Fig. 11
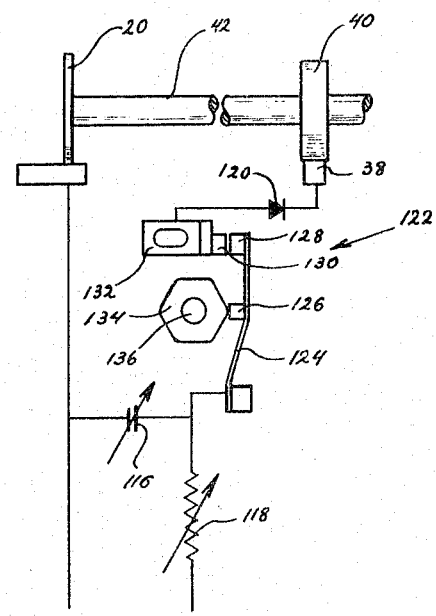
Fig. 12
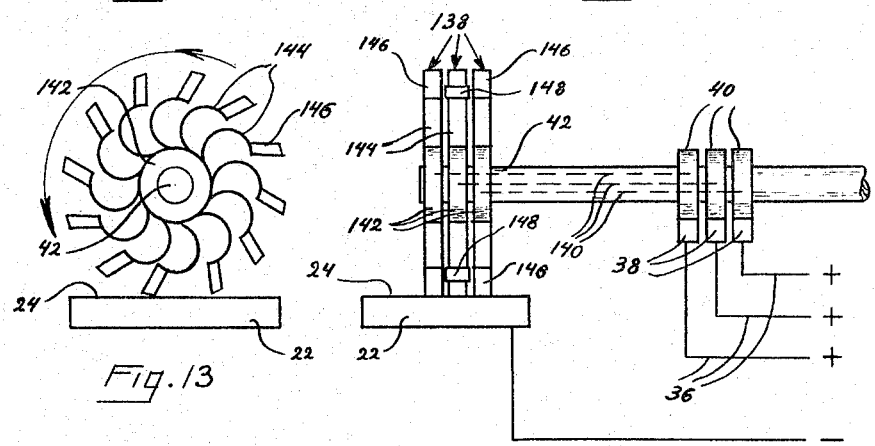
Fig. 13
Fig. 14
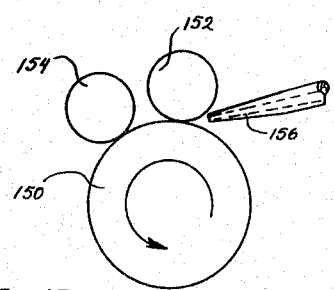
Fig. 15
INVENTOR.
HENRY BLASZKOWSKI
BY
Barnard, McGlynn & Reising
ATTORNEYS

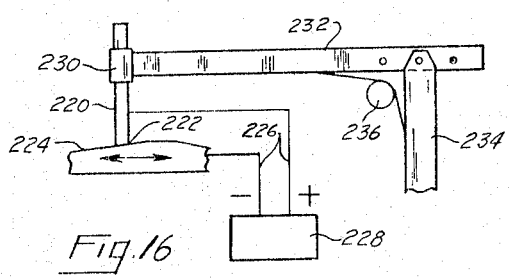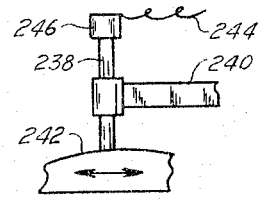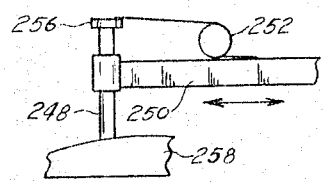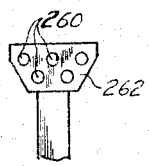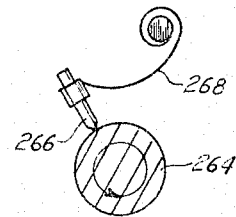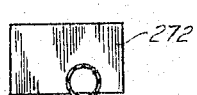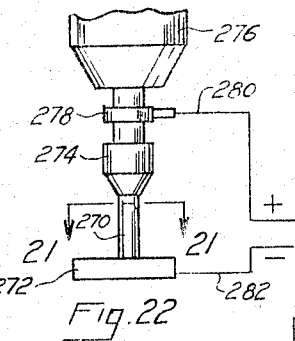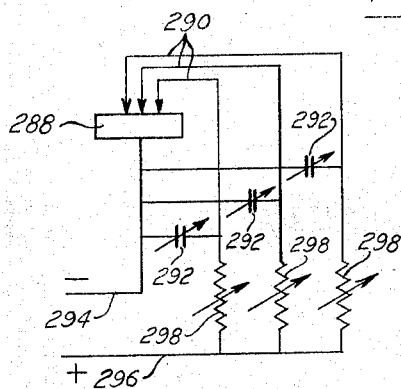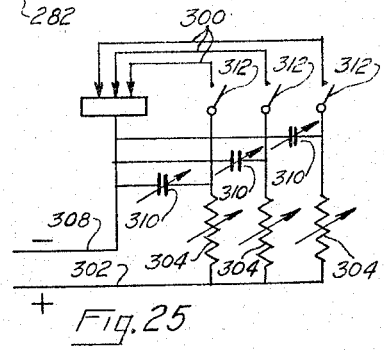

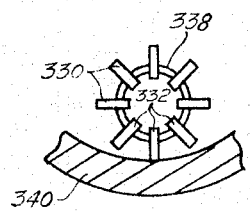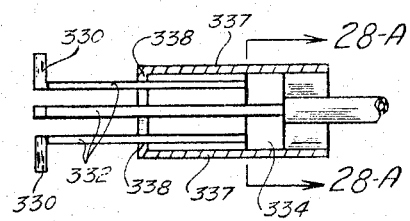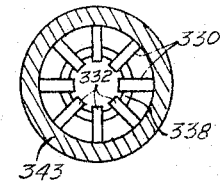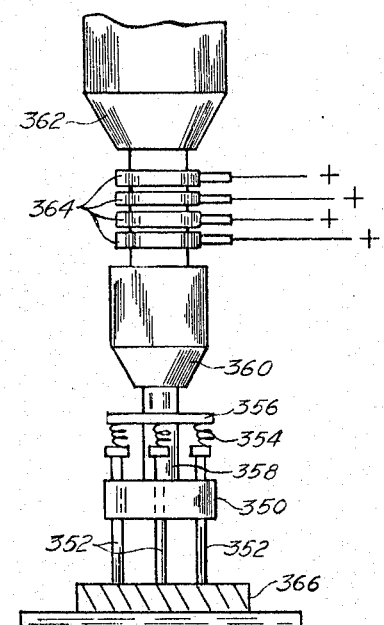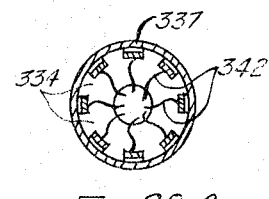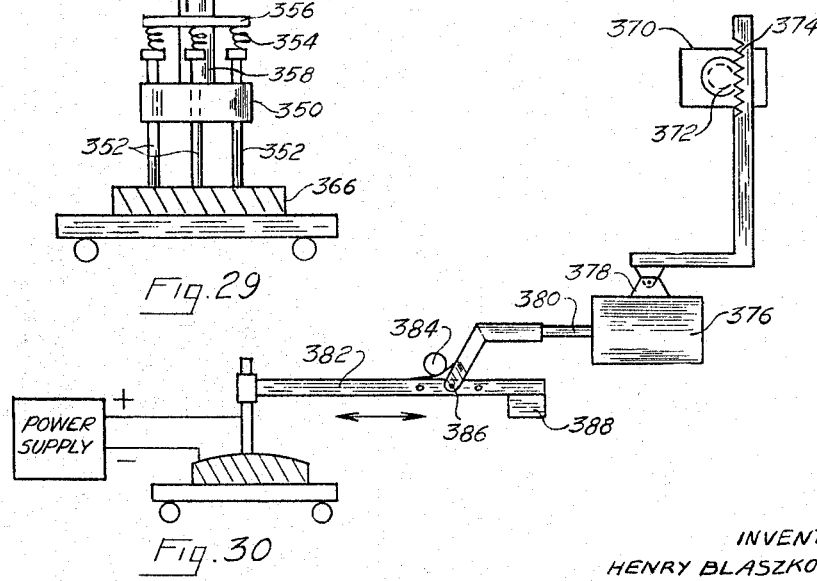

Oct. 4, 1966                H. BLASZKOWSKI                3,277,267
            METHOD AND APPARATUS FOR TREATING ELECTRICALLY
                          CONDUCTIVE SURFACES
Filed Sept. 20, 1965                                5 Sheets-Sheet 5

INVENTOR.
HENRY BLASZKOWSKI
BY
Barnard, McGlynn & Reising
ATTORNEYS

United States Patent Office 3,277,267
Patented Oct. 4, 1966

3,277,267
METHOD AND APPARATUS FOR TREATING
ELECTRICALLY CONDUCTIVE SURFACES
Henry Blaszkowski, 7312 Bingham, Dearborn, Mich.
Filed Sept. 20, 1965, Ser. No. 488,626
115 Claims. (Cl. 219—76)

This invention relates to methods and apparatus for treating electrically conductive surfaces and more particularly to methods and apparatus for hardening metal surfaces by coating or changing their metallurgy by creating intense localized electrical heating. More particularly, this invention relates to improvements in methods and apparatus for carbide deposition on a surface by means of repeated electrical discharges between the surface and an electrode, whereby the cost of required equipment is greatly reduced, greater flexibility of operation and application and more consistent and more effective results are obtained than are presently available by known processes and apparatus.

This patent application is a continuation-in-part of my copending U.S. patent application Serial No. 442,636 filed March 25, 1965, in turn a continuation-in-part of Serial No. 238,314 filed October 23, 1962, which was a continuation-in-part of my previous U.S. applications Serial No. 184,473 filed April 2, 1962; Serial No. 853,883 filed November 18, 1959, and Serial No. 822,767 filed June 25, 1959, all of said applications except said Serial No. 442,636 being abandoned. This application is also a continuation-in-part of my copending applications Serial No. 378,321 filed June 26, 1964; Serial No. 367,628 filed May 15, 1964; Serial No. 381,671 filed July 10, 1964; and Serial No. 412,407 filed November 19, 1964; said application Serial No. 367,628 being a continuation-in-part of application Serial No. 218,486 filed August 20, 1962 (now abandoned) and also being a continuation-in-part of said applications Serial No. 853,883 and Serial No. 822,767; said application Serial No. 381,671 being a continuation-in-part of said applications Serial Nos. 367,628 and 822,767; and said application Serial No. 412,407 being a continuation-in-part of application Serial No. 195,918 filed May 18, 1962. In effect, this instant application combines said applications Serial No. 367,628 and Serial No. 442,636 together with portions of applications Serial No. 378,321, Serial No. 381,671 and Serial No. 412,407 and additionally includes certain further embodiments of the invention disclosed therein.

Various types of apparatus are presently available in commercial form for impregnating or depositing carbides on the surfaces of steel tools, dies, and the like. The processes employed in such apparatus may be generally divided into two classes: (1) electric arc techniques, and (2) contact discharge techniques.

The technique of hard surfacing or facing metal surfaces with another metal by means of electric arc welding is well known. In the arc method a potential difference is established between the electrode and the workpiece and the electrode is brought into contact with the workpiece. An electric arc is struck between the electrode and the workpiece immediately upon contacting, and then withdrawing the electrode from the surface of the workpiece for a short distance and holding it there. The electric current which flows through the air gap is high and a great deal of heat is liberated at a very high temperature. This is sufficient to melt the heated area of the workpiece and the electrode tip. Metal is transferred in the arc from the electrode to the workpiece. When it is desired to break the arc, the arc is extinguished by moving the electrode quickly away from the workpiece.

Various techniques have been employed to maintain the gap necessary for successful carbide coating with an electric arc. For example, the electrode is frequently provided with a non-conductive projecting surface or flange which contacts the workpiece and maintains a consistent gap between the electrode and the workpiece. In one technique, disclosed in Patent 2,994,762 to Todd, a mixture of granular non-conductive material and a carbide is deposited as a layer on the workpiece and the electrode passed along the upper surface of the granular non-conductive material so as to provide a spacing. An electrical circuit is provided suitable for creating arcs through the spacing between the electrode and either the workpiece or the carbide material. While this process may be used for hard-surfacing metals in heavy industrial applications, it is disadvantageous in the most important cases where hardness is required, such as high-speed cutting tools and dies. These workpieces cannot be subjected at their working surfaces to arc welding because the intense heat of the arc causes distortion, oxidation or annealing of the workpiece, and the destruction of dimensional precision.

The second technique presently in use for depositing carbide is characterized by instantaneous discharges occurring at a point of contact between the electrode and the workpiece, rather than arcing across an air gap existing therebetween. In the available contact discharge apparatus, a tungsten carbide anode is vibrated to repeatedly (several thousand times per minute) make and break electric contact with the workpiece, which constitutes a cathode. Electrical discharge occurs substantially at the moment of contact, causing melting of the carbide and deposition on the surface of the workpiece. The carbide anode is pressed with modeate pressure against the workpiece at this time, thereby tending to causing the molten carbide to be impregnated in the surface. As the carbide anode is repeatedly lifted away from the surface of the workpiece (during vibration), arcing is prevented by virtue of the action of a condenser in the D.C. electric supply system. In essence what happins is this: upon contact between the electrode and workpiece, the condenser discharges instantaneously thereby creating a high-energy current flow which melts the electrode and workpiece material at the point of contact. When the electrode is pulled away from the workpiece, disrupting the weld formed by this melting, no arc forms in the air gap because the condenser has discharged to a voltage insufficient to maintain an arc across the gap. Since the voltage of the system is only 110 or 220 volts, arcing cannot be initiated by breakdown of the gap between the workpiece and the electrode (thousands of volts being required for ignition). Current flow will not recur until contact is again made between the electrode and workpiece.

Thus, this "contact discharge" method as presently in use differs from ordinary arc welding in that the electrical discharge occurs across an area or point of contact between the electrode and the workpiece surface rather than across a gap existing therebetween. Whereas during arc welding heat is generated continuously during the existence of the arc, in the "contact discharge" technique the workpiece and electrode are heated only during the instantaneous high-energy discharge.

This makes it possible to deposit carbide without serious oxidation or deformation of the workpiece, and without softening the workpiece by annealing or destroying dimensional precision. Increases in tool life of about 500% have been reported as a result. However, my experience with the process, as currently practiced, has indicated certain serious shortcomings and difficulties. I have found that the amount of carbide actually deposited on the workpiece is frequently almost imperceptible. Apparently this is due to the fact that the carbide of the electrode decomposes into its constituent elements before it is deposited. The increase in tool life is therefore attributable to heat treatment or the workpiece rather than carbide deposition. In addition, the results are extremely variable, depending very markedly on the skill, experience, and care of the operator.

Experience with the vibrating electrode process has thus failed to produce consistent results. While large improvements in tool or die life have been obtained in some cases, in other cases there has been no substantial change or even a substantial decrease.

It is recognized in industry that if a carbide deposition process could be worked out which would be low in equipment cost, flexible in operation without requiring special skills, and—most important—would give consistently good results, such a process would greatly benefit many industries on account of the increased life of tools and dies etc.

The present invention fulfills these needs. It makes it possible to produce coatings of types hitherto unknown, being exceedingly uniform and non-porous in character, and being highly effective to increase the life of tools, dies and the like.

In general, I accomplish the desirable results in accordance with the preferred embodiments of the invention, through the use of a coating method wherein the electrode contacts the workpiece surface, and the contacting region is moved with respect to the surface with a motion possessing at least a substantial component parallel to the surface in the region contact. This motion may be produced by rotation, which is generally preferred, or by sliding movement of the electrode in a direction parallel to the workpiece surface as hereinafter described in detail.

With the rotary technique the electrode is preferably rotated against the workpiece tangentially, in such a manner that sliding contact occurs only along a point, a plurality of points, or a short line. For example, the electrode may comprise a relatively thin circular rotating disc (e.g., 1/8 inch thick and 1 inch in diameter), contacting the workpiece surface along its outer periphery. The axis of rotation of the electrode may be parallel to or at any angle with respect to the surface. In an alternative embodiment the electrode does not comprise a disc, with a continuous round outer periphery, but rather is interrupted at one or more circumferential positions—thus comprising one or more radially-projecting contacting tips interrupted by one or more non-projecting, non-contacting regions.

The principal characteristic of my preferred technique is that energy discharge from the electrode to the workpiece, and hence fusion of the coating material with the workpiece surface, is accomplished by instantaneous discharges through relatively small points of contact created between the electrode and the workpiece surface as the region of contact on the electrode is moved with respect to the workpiece surface with a motion possession a substantial component parallel to the surface. Since fusion at each point is accomplished at the time of contact, there is no need for continued heating, the method is thus not dependent upon nor does it involve the maintenance of any arcs. The relative sliding motion between the electrode and workpiece breaks the welds created at the points of discharge and wipes and spreads the molten metal and/or carbide along the surface of the workpiece.

The relative surface speed of the electrode will control or influence the discharge frequency intensity of the discharges and particularly by using a rotary electrode, the surface speed can be independent of the translatory motion of the electrode along the workpiece. This permits the use of electrodes having small diameters, e.g., 1/8 inch in diameter, which provide a very small area of contact with the workpiece with the attendant advantage of intensifying the electrical discharges by increasing the current density in the area of contact.

With my technique the electrode employed can be of carbide or other fusible material which is transferred onto the workpiece surface by the intense localized electrical heating. However, and as will be described in detail hereinafter, such electrode composition is not essential to the practice of the invention since another important feature of the invention is to introduce or supply at least a portion of the carbide (or other fusible material desired to be applied) onto the workpiece surface in the form of a powder, preferably by precoating the surface with a slurry of such powder. This enables the coating or impregnation of the surface to be accomplished without reliance on transfer of the coating material from the electrode and such feature while serving to particular advantage in combination with the wiping action of the rotary or sliding electrode feature, also serves to considerable advantage with a vibratory make and break contact type electrode.

It will be manifest that the present technique, in its most preferred embodiments wherein the electrode is rotated or slid in parallel relationship over the workpiece surface, differs from the earlier described vibratory method. For example, whereas in the vibratory method the discharge occurs at each contact with the workpiece surface and the number of discharges per unit time is a function of the frequency of vibration, (usually 120 vibrations per second) the present technique is not dependent upon any vibration frequency and the rate of discharge can be far in excess of that occuring in the vibratory method. In addition, the frequency may be varied simply, as by altering the rotational speed of the rotary electrode. The electrical circuitry and mecanical arrangement of the electrode and workpiece are particularly suited for repressing the formation of arcs through any gap between the electrode and the workpiece. Preferably, this is accomplished by the use of an electrical circuit having the characteristics of condenser discharge. In such a circuit the condenser discharges upon contact of the electrode with the workpiece, and then recharges apparently as the contacting region changes from one microscopic contact to the next between points on the electrode and workpiece. Since current flows only during the extremely short periods of condenser discharge (each being in the range of 15–40 microseconds) and through microscopic areas of contact, the workpiece surface is not bulk heated and thus never attains those temperatures which ordinarily produce distortion or annealing of the workpiece material. In addition, the immediate quenching of the heated material by the surrounding metal after each discharge produces a highly desirable heat treating effect which in itself substantially increases the life of the tool.

With the condenser discharge circuit, regardless of whether an interrupted or continuous rotary electrode surface is employed, or whether the electrode is generally linearly slid with respect to the workpiece surface, discharges resulting from the short duration pulses of electrical energy are repetitively produced along the contacting area of the electrode. Each discharge produces an instantaneous localized melting of the electrode and the contacted workpiece surface. As the contacted region of the electrode moves with respect to the workpiece surface, electrode material is left deposited upon the workpiece surface. Where powdered carbide or other fusible material is employed, as is preferred, then of course the powder is fusion bonded to the surface by the intense localized heating.

The contacting area between the electrode and the workpiece surface may be in the form of a single point, a plurality of such points, or a line of contact. The total area of contact between the electrode and the workpiece surface must be sufficiently small to maintain energy discharges of sufficient intensity to melt the carbide and workpiece material. The pressure applied to the electrode against the workpiece surface should not be excessive in order to avoid low resistance current flow which would reduce the intensity of the discharge below its practical value.

Other features and advantages of my invention will more fully appear from the following description and drawings wherein are disclosed preferred embodiments. The description makes reference to the drawings in which:

FIGURE 1 represents a side view (partly in cross-section) of a preferred embodiment of the apparatus of the invention, which is used to illustrate a preferred mode of operation;

FIGURE 2 is a fragmentary elevational view showing an alternative type of electrode mounted in the apparatus of FIGURE 1;

FIGURE 3 is a fragmentary elevational view of another modified type of electrode;

FIGURE 4 is a fragmentary elevational view of another modified type of electrode;

FIGURE 5 is a cross-sectional view taken along the lines 5—5 in FIGURE 4;

FIGURE 6 is an end view of another modified type of electrode;

FIGURE 7 is a fragmentary elevational view of a hollow electrode such as that shown in FIGURES 3-5 mounted with means supplying powder or gas through the interior of the electrode;

FIGURE 8 shows a fragmentary elevational view of a modified type of apparatus for supporting the electrode;

FIGURE 9 is an elevational view of a modified type of apparatus similar to that of FIGURE 8;

FIGURE 10 is an end view of a slip ring which may be employed with apparatus of the type shown in FIGURE 1;

FIGURE 11 shows a modified condenser circuit which may be used in conjunction with the apparatus of FIGURE 1;

FIGURE 12 shows schematically the construction of one of the breakers employed in the circuit of FIGURE 11;

FIGURE 13 is an elevational view of a coating apparatus in which a plurality of electrode units are used in parallel;

FIGURE 14 is a side view of the apparatus of FIGURE 13;

FIGURE 15 is a schematic view of a method for coating a circular workpiece.

FIGURE 16 represents a side view of apparatus for practicing a preferred embodiment of the method of the present invention, wherein an electrode is supported so as to follow the irregular surface of a workpiece which is moved generally parallel to their area of contact;

FIGURE 17 represents a side view of apparatus for practicing an alternative embodiment of the method of the present invention;

FIGURE 18 is a side view of apparatus for practicing another embodiment of the present invention;

FIGURE 19 is an end view of a multiple contact electrode for use in connection with the present invention;

FIGURE 20 is a schematic view of apparatus for practicing the present invention on a circular workpiece;

FIGURE 21 is a top view of apparatus useful in practicing the present invention and employing a circular electrode;

FIGURE 22 is a side view of the apparatus of FIGURE 21;

FIGURE 23 is a top view of another multiple contact electrode useful in connection with the present invention;

FIGURES 24 and 25 are schematic diagrams of electric circuits useful in connection with the present invention;

FIGURE 26 is a side view of a multiple electrode unit for coating interior diameters of parts;

FIGURE 27 is an end view of the electrode of FIGURE 26 employed to coat a concave surface;

FIGURE 28 illustrates the manner of use of the electrode of FIGURES 26 and 27 to coat an internal diameter;

FIGURE 28A is a cross-sectional view of the electrode taken along line 28A of FIGURE 26;

FIGURE 29 is an elevation view of another multiple electrode device;

FIGURE 30 is a general schematic view of a single electrode device with a system allowing the electrode to follow an irregular surface;

Figure 31:
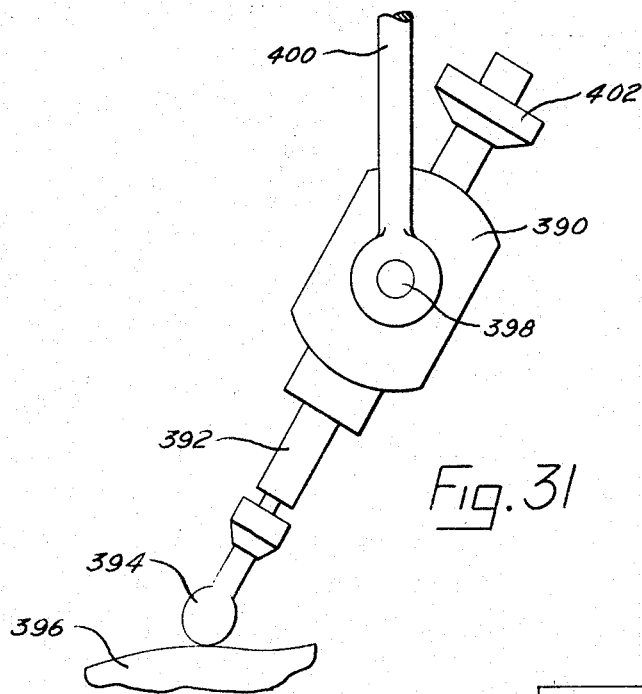
FIGURE 31 is a side view of apparatus employing a spherical electrode.

Referring now to the drawings in detail, FIGURE 1 shows a preferred mode of operation of the invention, utilizing a rotating disc-type electrode 20 together with certain features designed to facilitate the maintenance of proper contact between the electrode 30 and the workpiece 22. In this embodiment, the electrode 20 (which preferably is relatively thin, e.g., ⅛ inch thick) rotates substantially in a plane which is perpendicular to the substantially flat surface 24 of the workpiece 22. Preferably, the electrode 20 comprises a hard carbide, such as tungsten carbide, titanium carbide, chromium carbide or the like. A source of electric potential 25 suitable for creating electric discharges at contact between the annular outer surface of the electrode 20 and the surface 24 of the workpiece 22 is provided as shown. This source of electric potential is preferably a D.C. voltage of the order of magnitude of 60–200 volts, drawing from a positive electrical line 26 and a negative electrical line 28. A variable resistor 30 permits regulation of the current across the electrode-workpiece contact by regulation of the charging of the capacitor 32. The variable capacitor 32 is connected across the line to store energy for discharge and prevent arcing, immediately after discharge, across any gap that might be formed between the electrode and the workpiece (e.g., when an interrupted electrode is used or when the electrode is both rotated and vibrated in and out of contact).

Electrical line 36 connects the resistor 30 to a brush 38 maintained in electrical contact with a slip ring 40 mounted for rotation with a shaft 42. An electrode 20 is also mounted for rotation with shaft 42 as shown, so that current flows along the shaft 42 to the electrode 20. The shaft 42 is rotatably driven by a suitable motor 44 of the variable speed type. Motor 44 is preferably mounted on a swivel shaft 46, which is in turn rotatably mounted on a vertical support 48 as shown. A spiral spring 50, attached at one end to the vertical support 48 and at the other end to the swivel shaft 46, and spiralled around the swivel shaft 46, is tightened to a predetermined extent, thereby continually urging electrode 20 against the surface 24 of the workpiece 22 with a predetermined pressure sufficient to maintain adequate electrical contact between the two. Electrical insulation 52 prevents the flow of current into the motor 44.

During operation, the electrode 20 is rotated at a predetermined speed, remaining in contact with the surface 24 of workpiece 22 and being urged thereagainst with a suitable pressure, as indicated above and as further described hereinafter. The speed of rotation can, for example, be between 40 and 10,000 r.p.m. it being understood, of course that the smaller the electrode diameter the greater the r.p.m. required to attain an equally high sliding speed. Electrical discharges between the electrode 20 and the workpiece surface 24 continue during the operation, resulting in the deposition of carbide on the surface 24. Continual slow relative translatory motion between the electrode 20 and the workpiece surface 24 may be accomplished in known manner, e.g., the workpiece 22 may be mounted on a milling machine permitting it to be automatically moved forwardly at a constant rate of speed. Because the mounting means described above constantly urges the electrode 20 against the workpiece surface 24, the electrode will automatically follow the surface even if it is irregular or curved. This eliminates the need for special skill in operation, in order to make continual adjustment of electrode position, and thus makes automatic operation practicable. This mode of operation provides consistent carbide coatings of high quality (although a number of modifications and improvements over it may also be provided, as indicated below).

I prefer to employ an electrode 20 comprising carbide material because of its hard-surfacing and wear-resistant properties when deposited on the workpiece surface. However, materials such as silver, brass, or other corrosion-resistant metals may also be applied to the workpiece surface where desired. Carbon electrodes may be used where heat treatment of the workpiece surface is desired, preferably in conjunction with rotational and vibrational motion of the electrode. The carbon electrode is rapidly consumed when rotational motion alone is employed, due to the roughened workpiece surface created by the electrical discharges. Vibration will reduce the rate of such electrode consumption and will interrupt the low-resistance current flow, thereby intensifying the electrical discharges. I have found that the contacting pressure must not be excessively great, since this suppresses high intensity electrical discharges and tends to remove metal from the surface, particularly where the electrode is rotated at high speeds.

At any given instant, luminous discharges occur between the electrode 20 and the workpiece surface 24 substantially along the line of contact therebetween. Each of these discharges occurs upon contact between microscopic points on the electrode and workpiece surface. Due to the extremely small area through which each such discharge occurs, each discharge is of extremely high intensity thereby producing extremely high temperatures exceeding the melting temperatures of both the electrode and the workpiece material. Upon discharge therefore, the workpiece material and the material being deposited are fused. (Alternatively, the method may be employed to raise only the temperature of the workpiece above its melting point, thereby producing heat treatment of the workpiece surface rather than carbide depositing.) The electric discharges between microscopic contacting regions on the electrode and workpiece material are produced by the short duration pulses of electrical energy resulting from discharge of the capacitor 32. As the electrode rotates, the liquified contacting regions are separated by the sliding or wiping motion of the electrode, thus instantaneously breaking the short circuit existing therebetween and leaving electrode material deposited upon the workpiece surface.

As each minute point of contact between the electrode and the workpiece is lost, either through dissipation of the contacting material as a result of the intense electrical discharge or through motion of the electrode apparently sufficient resistance is created between the electrode and the workpiece surface to enable recharge of the condenser until the next contact discharge of the electrode with a point on the workpiece surface. With the capacitor 32 discharged, the electrical field between the workpiece and the departing line of contact has decayed sufficiently to prevent arcing across any existing gap. Thus, the next electrical discharge will occur between the workpiece surface 24 and a different point or line of contact on the electrode 20.

Of course, the slow relative translatory motion or feed of the workpiece with respect to the axis of the electrode causes the line or point of contact upon the workpiece surface 24 to be advanced. Hence there is no overheating and the entire surface can be coated.

I have utilized capacitors having capacitances in the range of about 1–150 microfarads and a variable resistor in the range of 8–70 ohms under varying sets of conditions and have obtained satisfactory results. Other types of circuit systems providing electrical, magnetic, chemical, mechanical or other means of rapidly depriving the electrode of sufficient voltage to prevent drawing out of the arc may alternatively be used, some of these systems being described in greater detail below. It may be noted, however, that capacitors serve the funtion not only of inhibiting arcing but also of storing energy in the circuit, thereby permitting a small power supply system to deliver intense instantaneous bursts of energy. Preferably, the electrical system will provide both of these features, which may be referred to as "having the characteristics of condenser discharge,"—namely—(1) depletion of voltage below the arcing voltage upon and immediately following discharge and (2) storage of energy, permitting the discharge of instantaneous intensified bursts of energy at the region of contact.

The voltage supply should be well below the spark breakdown voltage (which is about 2,000 volts for one millimeter air gap), and should be sufficient to provide a heating current upon contact (preferably not less than about 20–40 volts). I prefer to use a D.C. voltage with the electrode being the positively-charged terminal. An advantage of this polarity is that more heat is normally generated in the positive electrode than in the negative workpiece, thereby helping in the transfer of material from the electrode to the workpiece. However, under some conditions, I may reverse the polarity depending on the materials involved and the details of operation to be performed. For example, if higher temperature at the workpiece surface is desired, or if carbide powder is employed in the region of the electrode contact, a negatively charged electrode may be desiable. I may also reverse the polarity in some cases where it is desired to decrease or "undercut" the workpiece surface dimension by removing a thin layer of material from it. By appropriate adjustments of the electrical circuit, and by varying the speed of the electrode, I have found it possible, while surfacing a workpiece, with either polarity, to build up its surface, maintain its dimensions constant, or decrease it. Thus, I am able not only to hard-surface a workpiece, but also to correct the dimensions at the same time, if desired.

For purposes of exemplification, the "condenser discharge" circuit employed in FIGURE 1 may utilize the following voltage, resistance and capacitor settings: for an initial or "rough" coat (as hereinafter further described), with a 60-volt D.C. power source, 18 microfarads capacitance, 8 ohms resistance, the peak current will be 70–80 amps. with a pulse width of 35–40 microseconds; for a final or "finish" coating (also as hereinafter further described), with the capacitance reduced to 4 microfarads and the resistance increased to 16 ohms, the peak current will be 40–50 amps with a pulse width of 17–20 micro-seconds.

Referring again to FIGURE 1, I have also provided a separately-wired variable speed motor 54 rotatably driving a substantially horizontal shaft 56. An offset weight 58 is eccentrically mounted for rotation with shaft 56. As the weight 58 is rotated, it tends to cause an oscillatory upward and downward force between the electrode 20 and the workpiece 22, thereby causing a vibratory action of the electrode 20. An advantage of adding this vibratory action to the rotational action of a circular electrode is that it periodically insures the breaking of electrical contact in the event that the area of contact is excessive or some particle or mass of material has caused a low-resistance current flow between the electrode 20 and the workpiece 22 which will prevent full recharging of the condenser and therefore reduce the intensity of the electrical discharge. In addition, the impact or pressing action which results tends to increase the depth of penetration of the coating. This additional vibratory action is found to be of more value when the electrode is of the uninterrupted circular type than when it contains interruptions, as described below. It is also more beneficial when the workpiece surface is concave to the extent that the area of contact between the electrode and the workpiece surface is increased beyond a point or thin line of contact and the value of positive mechanical interruption of contact is consequently increased.

Unlike the commercially available vibratory apparatus, the apparatus of FIGURE 1, even if employed solely as a vibrator, permits the electrode to automatically follow irregularities or changes in the elevation of the workpiece surface 24. It also facilitates the coating of deep cavities and the inner surfaces of tubing and the like. If desired, the electrode 20 employed may be of the type shown in FIGURES 2–6 and 8 mounted on the shaft 42 in the manner disclosed in each of those embodiments. In some cases, e.g., where the workpiece surface includes sharp crevices or recesses, a vibratory motion is preferable in order to coat these otherwise inaccessible areas.

The operating procedure described above in connection with FIGURE 1 can be advantageously altered by applying the surfacing material (e.g., tungsten carbide or the like) to the workpiece surface in the form of a finely divided powder. Preferably the powder is comprised of finely crushed sintered carbide though if desired other materials such as boron or boride powder may be added. The electrode in this case need not necessarily contain any carbide or hard-surfacing material, as the deposition occurs principally if not entirely from the powder. I generally prefer to deposit the powder on the workpiece surface in the form of a slurry comprising the powder suspended in a readily-vaporizable liquid such as carbon tetrachloride, turpentine, gasoline or die maker blue. For best results the liquid should be evaporated before the electrode passes over the powder, though for some purposes, it may be desirable to include a non volatile carbon-containing material as will hereinafter be described.

Alternatively, the powder may be applied in a dry form. The powder may be blown with an inert, nitriding, reducing or other gas into the contacting region between the electrode and the workpiece through the interior passage of a hollow electrode or a nozzle extending in close proximity to the region of contact. When the powder is introduced in this manner, it is blown into the region of contact between the workpiece and electrode and is immediately melted and combined with the workpiece melted material so as to form an integral part of the workpiece surface.

When the electrode contacts the powder, the capacitor discharges through the contacting conductive particles into the workpiece surface. I have found that an excessive amount of slurry in contact with the electrode will merely produce a low-resistance short circuit and melting temperatures will consequently not be achieved. (This result cannot always be prevented by increasing the current since excessive current will produce undesirable heating of the workpiece surface.) Preferably, the particle size of the powder in the slurry should be in the range of 150–450 mesh, and the slurry should be applied in a thin layer, e.g., .001–.003 inch.

As a result of the high temperatures attained at the region of discharge a small molten pool of metal is formed on the workpiece surface into which the material of the slurry particles is forced by the pressure applied by the electrode. The slurry material is thereby distributed and held or fused within a matrix or binder consisting of the previously melted workpiece material.

I have found that thicker carbide coatings can be produced more rapidly by this slurry method than by methods relying solely on deposition by carbide electrodes. I have also found it possible to deposit other materials in this way, which may not be very suitable as electrodes.

The slurry may contain carbon or carbon-containing compounds such as non-volatile hydrocarbons. The carbon reacts with the metal under the heat of the electrical discharge to provide a high carbon content surface. Alternatively, the carbon or non-volatile hydrocarbon or the like can be used as an additive to the carbide slurry to provide a carbon rich atmosphere and inhibit decarburization of the carbide.

Thus, it is possible to produce extremely hard and abrasive surfaces in this manner, as well as surfaces having other desired properties, without regard to whether or not the materials to be deposited are suitable as electrode materials.

Referring once again to the drawings, a conventional chuck 60, as indicated in FIGURE 1, permits the ready interchange of electrodes. I have also shown in FIGURE 1 an alternative method of applying a fixed pressure between the electrode 20 and the workpiece 22, in place of spring 50, i.e., a magnetic system indicated generally as 62 and shown only schematically, for convenience. While both the magnetic system 62 and spring 50 are shown in FIGURE 1, it should be understood that they are normally intended to be used as alternatives rather than concurrently. Magnetic system 62 comprises a curved solenoid or electro-magnet 64 which is rigidly mounted on the vertical support 48 (and is thus fixed in position). A similarly-curved magnetic core 66 is fixedly mounted on the housing of motor 44 (and therefore moves with it as the latter swivels around swivel shaft 46). When a suitable electric current is sent into the electro-magnet 64, the core 66 tends to move along the electro-magnet due to the induced magnetic force. However, the workpiece 22 prevents this, and the predetermined force is thus exerted between the electrode 20 and workpiece 22, its extent depending on the current applied to electro-magnet 24. If desired, it is also possible to utilize one or more electromagnets for vibrating an electrode by introducing a fluctuating current to the electro-magnet.

The shaft 42 is also provided with a flexible coupling 68 which permits the outer end of the shaft and the electrode to pivot slightly with respect to the chuck 60 and the remainder of the apparatus when minor variations of elevation are encountered in the workpiece surface 24. This coupling 68 may also be used in any of the modifications of the apparatus described below. Without such a flexible connection, variations in the surface of the workpiece can produce an undesirable uncontrollable oscillation of the entire device about the swivel shaft 46. The flexible coupling 68 may be of any conventional type permitting pivoting of the forward end of the shaft 42 and electrode 20 with respect to the rearward end of the shaft 42 and the chuck 60, and providing electrical contact between the forward and rearward end of the shaft 42. Although this flexible coupling is preferably employed where the electrode is not vibrated, if desired the coupling could be designed to permit only a very limited motion of the electrode with respect to the remainder of the apparatus, thereby permitting the electrode to be vibrated as well as rotated.

Other modifications relating to the means of support of the apparatus and the type of electrode used are also described below.

Referring now to FIGURE 2, I have shown an uninterrupted electrode 70 rotating about an axis which is at an angle to the surface 24 of the workpiece 22. The generally annular contacting surface 72 is preferably bevelled, i.e., generally conical shaped, as shown, to make generally linear tangential contact.

FIGURE 3 shows a modified electrode mounted about an axis at an angle to the workpiece surface 24 and comprising a cylinder 74 with a tip 76, and a longitudinal bore 78 extending through the electrode. This type of electrode can be mounted in the apparatus of FIGURE 1. If desired, an inert or reducing gas may be passed through the bore 78 during operation to insure against oxidation and decomposition of carbide material, or coating materials such as powdered tungsten carbide (with a suitable gas) may be fed therethrough. This modification of the electrode may be rotated in the same manner as that of FIGURE 2, or, alternatively, could be only vibrated, thereby producing the flattened tip 76 as shown. If desired, the electrode can be simultaneously rotated and vibrated at any desired angle.

FIGURES 4 and 5 show a modified form of the hollow electrode of FIGURE 3, in which a plurality of spaced radial slots 80 extend through the cylinder wall 74 to the bore 78, extending longitudinally back from a bevelled tip 81, a limited distance along the electrode. The slots 80 provide interruptions for the generally annular electrode surface. An important advantage of using interrupted electrodes, such as that shown in FIGURES 4–6 is that any flow of low-resistance current is repetitively interrupted, even under excessive pressure because the electrode repetitively makes and breaks contact mechanically with the surface. Further, with a non-interrupted or continuous electrode, excessive pressure tends to suppress the electrical discharges. On the other hand, an interrupted type electrode gives a very uniform and stable electrical resistance, at the region of discharge, thereby tending to result in more consistent electrical discharges. In addition an interrupted type of electrode in general exerts a substantially greater impact against the surface than a continuous electrode, resulting in deeper penetration and impregnation of the coating composition in the surface, particularly when the coating composition is in the form of a powder, as described herein. The circumferential distance between the outwardly projecting contacting portions, and the speed of rotation, affect the degree of impact and the wiping effect when the metal in the region of contact is in a plastic stage. By proper selection of these factors, together with proper selection of electrical current characteristics and suitable relative speed of advance of the workpiece, any desired surface finish can be obtained. The circumferential length of each outwardly projecting portion will determine the number and intensity of the electrical discharges and will control the amount, if any, of resistance current flow. The intensity of the discharges will be at a maximum when the beginning of each segment contacts the workpiece, and will be then succeesively reduced until the next gap in the electrode is reached.

If desired, I may place a collar (not shown) over the slots 80, blanking them off everywhere except in the region of the tip 81; this guides the flow of any material fed through the bore 78 directly to the coating area. If desired, I may also close off the end of the bore 78, to force the material fed (e.g., gas or powdered solid) through the slots 80 in the tip 81. Rather than using a collar, I may simply terminate the slots 80 in the region of the tip 81.

FIGURE 6 shows a modification of the interrupted electrode in which a disc-type electrode is provided with slots 82 interrupting the annular contacting surface of the electrode and thereby defining a plurality of spaced radially-projecting contacting portions 84. The advantages of the interrupted-type electrode have been explained above.

FIGURE 7 shows how the hollow electrodes of FIGURES 3–5 can be employed in apparatus similar to that of FIGURE 1 together with means for supplying powder and/or gas through the interior of the electrode. The electrode shown is identical to that of FIGURE 3, having a longitudinal bore 78 extending along the interior of a cylinder 74. The electrode is rigidly mounted vertically in a collar 86 at the end of a horizontally extending arm 88. The arm 88 may be a part of the shaft 42 in the apparatus of FIGURE 1, with the motor 44 removed or inoperative so that only a vibratory motion is imparted to the electrode. A hollow cylinder 90 fits over the upper end of the electrode and has an inlet tube 92 projecting through its side communicative with the interior of the electrode. A flexible conduit 94 fits over the inlet tube 92 and is adapted to provide powder and/or gas to the interior of the electrode. This construction permits the electrode to be vibrated axially with respect to the workpiece surface, and reduces the area of contact between the electrode and workpiece as compared to that of FIGURE 3. In addition, this construction permits for more convenient access to deep cavities, tubes and the like. Such embodiments as shown in FIGURES 3 and 7 illustrate utilization of a vibratory electrode with the feature of introducing the carbide or other fusible material onto the workpiece surface in powder form. As another example and as indicated above, the apparatus of FIGURE 1 may be operated solely as a vibrator, without rotating electrode 20. The hollow electrode of FIGURES 3 or 7 allows the powder to be fed therethrough to the workpiece or the powder can be precoated onto the workpiece as a slurry and the bore through the electrode used to convey gas to the area of electrode contact if so desired.

The structure of FIGURE 7 is also particularly useful where the coating operation takes place in submerged conditions in a liquid. In such a case, the fluid may be drawn out through the interior of the electrode 74 and conduit 94, circulated through a suitable filter, and returned to the tank or container in which the coating operation is performed. This will remove the contaminants formed by erosion of the metal and will maintain the desired visibility through the liquid at the region of contact. If carbide particles are present in the liquid, they will be drawn into the region of discharge and fused into the workpiece surface. The same electrode may be employed when the coating operation is performed in a gas-filled tank. Carbide particles are agitated in the gas which is passed either in or out of the tank through the electrode bore and continuously recirculated.

In FIGURES 8 and 9, apparatus is shown for passing a disc-type electrode over the workpiece surface. FIGURE 8 shows this apparatus mounted on the shaft 42 of FIGURE 1. The electrode 20 is secured to an axle 96 which extends rotatably through a pair of spaced parallel flanges 98 projecting at the end of the shaft 42. A drive shaft 100, actuated by a suitable motor (not shown), extends parallel to the shaft 42 and is mechanically connected through a gear box 102 to one end of the axle 96. Alternatively, a flexible shaft or coupling may be used in place of the gear box 102. Thus, actuation of the shaft 100 produces a rotational movement of the electrode 20. With this apparatus mounted at the end of the shaft 42 of FIGURE 1, the motor 44 is removed or inoperative so that only a vibratory motion is imparted to the electrode through the shaft 42, the rotational motion being imparted by shaft 100 as aforedescribed. The resulting apparatus provides both vibratory and rotational motion at the electrode and permits the electrode to follow the workpiece surface regardless of irregularities or changes in surface elevation occurring therein.

FIGURE 9 shows a modification of the apparatus of FIGURE 8 adapted for manual use. The disc-type electrode 20 is mounted on the axle 96 which in turn extends through flanges 98 which project at the end of a shaft 104. The shaft 104 is fixed within a handle 106 which is adapted to impart an axial vibration to the shaft 104. This vibration may be achieved by any convenient means, e.g., an electromagnet. The electrode 20 may be rolled over the surface during the vibratory movement or, as is much preferred, may be driven to cause rotation and sliding movement thereof by an independent power source in the manner shown in FIGURE 8.

In certain situations, as described above with respect to vibration of the electrode of FIGURE 1, it is desirable to interrupt the current supply to the electrode either by mechanical or electronic means in order to prevent the capacitor from discharging before it is fully charged. In FIGURE 10 I have shown one such method of mechanically interrupting the current supply to the electrode. An interrupted or segmented slip ring 40 is rigidly mounted on the rotating shaft 42 which supports the electrode 20 in the manner shown in FIGURE 1. The slip ring includes a cylindrical conductive portion 110 which is interrupted at spaced points along its periphery by non-conductive sections 112. A brush 38, shown schematically, is attached to one terminal of the electrical supply system and is in known manner urged to contact the slip ring 40 as the shaft 42 rotates, thereby supplying electrical potential to the shaft each time that it contacts the conductive portion 110 of the slip ring. This electrical potential is discontinued each time one of the non-conductive sections 112 contacts the brush 38.

If desired, an additional brush 38[1] may be employed, as shown in FIGURE 10, similarly connected to the electrical supply system. The brush 38[1] is adapted to contact the conductive portion 110 when the brush 38 contacts a non-conductive portion 112, and vice versa. This arrangement permits greater flexibility in adjusting the discharge timing of the system.

An alternative method of depriving the electrode of electric potential at pre-selected intervals employs known electronic means including, for example, thyratron tubes.

When the second brush 38[1] is employed, a second indepenent condenser circuit can be used, in which case more intense electric discharges at a higher frequency can be obtained. This circuit may be employed in conjunction with each of a plurality of additional brushes 38[1] for improved results. Such a multiple condenser circuit is shown in FIGURE 11. A direct current source 114 charges four variable capacitors 116 through separate variable resistors 118. The negative terminal of the current source 114 is connected to the workpiece 22. Each capacitor 116 is connected through a rectifier 120 to a brush 38 mounted about the periphery of the slip ring 40 on the shaft 42. The position of the brushes 38 about the slip ring 40 will control the time of the electrical discharges.

If desired the slip ring 40 may be continuous (i.e., constructed solely of conductive material) and breakers or switches 122 placed in the circuit as shown in FIGURE 11. A construction for the breaker 122 is shown diagrammatically in FIGURE 12. A spring conductor 124 is connected at one end to the capacitor 116 and includes a non-conductive bearing block 126 midway along its length. A contact 128 constructed of suitable material having a high conductance and melting point, is mounted at the free end of the spring 124. A second contact 130 is mounted at the end of a timing adjustment member 132 which is connected to the rectifier 120, and is disposed immediately opposite contact 128. The spring 124 normally biases the contact 128 towards abutment with the contact 130. A hexagonal cam 134 is mounted on a rotatable shaft 136 and is adapted to bear against the block 126. The corners of the cam 134 tend to oppose the spring 124 and thereby separate the contacts 128 and 130; when the flat sides of the cam 134 abut the block 126, the spring 124 is permitted to urge the contact 128 into abutment with contact 130. Rotation of the shaft 136 thus produces a repeated interruption of the current flow to the brush 38. The timing adjustment member 132 can be adjusted to vary the distance between the contacts 128 and 130 and hence the time during which the contacts are closed. The shaft 136 may be rotated by an independent motor or, alternatively, may be rotated by rotation of shaft 42. If desired, the cam 134 may be mounted directly about the shaft 42.

A single cam 134 and condenser circuit of the type shown in FIGURE 12 may be employed, or a plurality of them as shown in FIGURE 11. When a plurality of breakers and condenser circuits are employed, the timing adjustments 132 are each adjusted differently with respect to one another so that each pair of contacts 128 and 130 closes at a successive point in time. This produces a uniform pattern of electrical discharge at the workpiece surface.

The breaker 122 of FIGURE 12 is efficient in operation and more economical than electronic circuits employing thyratron tubes. Electrical discharges created at the contacts 128 and 130 will not adversely affect the operation.

The polarity of the circuit of FIGURES 11 and 12 can be the reverse of that shown if desired. In such case, the rectifiers 120 will also be reversed.

For high-speed coating of relatively large surfaces, I may use a plurality of rotating electrodes (shown generally in FIGURES 13 and 14 as 138), mounted approximately parallel to each other (or at relatively small angles to each other) and generally contacting different portions of the workpiece surface 22. The condenser circuit may, if desired, include breakers of the type shown in FIGURE 12. Preferably, each of the electrodes is wired separately, as indicated, so that short circuiting of one does not prevent simultaneous discharging of another, thus, insulated wires 140 run from each slip ring 40 through the interior of shaft 42 to the hubs 142 of each electrode 138. Each hub 142 may be provided with a plurality of resilient radial leaf springs 144 equipped with carbide tips 146, so that the electrodes possess inherent flexibility and may thus be resiliently wiped against the surface 24 of the workpiece 22. Alternate electrodes 138 may be coated with insulating material as indicated at 148 in order to prevent short circuiting of one electrode set with another.

If desired, coil springs may be employed in place of the leaf springs 144. The springs, whether of the leaf, coil or other variety, may project from the hubs 142, at any desired angle.

In another modification of the apparatus of FIGURES 13 and 14, the polarity of the lines 36 leading to the brushes 38 is alternated from brush to brush, i.e., half the lines are positive and half negative. The workpiece 22 is not connected to the power supply. Discharges occur due to the short circuit created through the workpiece between adjacent oppositely charged electrode sets 138. By varying the current for individual electrode sets 138, each set can be adapted to produce a coating of different finish and thickness. For example, the set 138 which first contacts a given area of the workpiece, can be adapted to produce a "rough" coating, while the set last to contact the same area can produce a smoother or "finish" coat; the intermediate sets can be adapted to produce coatings varying between these two extremes. This technique thus permits the workpiece to receive its rough and final treatment in one operation.

FIGURE 15 shows schematically another modification of the present hard surfacing method and apparatus. A cylindrical workpiece 150 is rotatably mounted in abutment with a pair of rotatable disc-type electrodes 152 and 154 of carbide, steel, or other suitable metal. The workpiece 150 is rotated through suitable known power means (not shown) and is thereby adapted to rotate both electrodes 152 and 154. A nozzle 156 extends adjacent the contacting region between the electrode 152 and the workpiece 150 and is adapted to blow powder and/or gas into this region of contact. The preferred composition of the gas and powder are discussed above in detail. The electrodes 152 and 154 and workpiece 150 are connected respectively to the positive and negative terminals of a current source (not shown).

As the workpiece 150 is rotated the electrodes 152 and 154 are also rotated thereby producing repeated electrical discharges at the line or points of contact between each electrode and the workpiece. By rotating the electrodes at a different speed from that of the workpiece, sliding motion between the electrodes and workpiece can be attained. Also, sliding motion between the electrodes and the workpiece can be attained by driving only the workpiece to cause it to rotate, and using low efficiency bearings, in the nature of brakes, on the rotatable electrodes whereby the electrodes are caused to rotate by the motion of the workpiece, but with slippage between the surfaces. The powder is fused into the surface of the workpiece in the same manner as discussed above with respect to the introduction of a slurry into the region of contact. By using an inert gas oxidation can be reduced as previously discussed.

If desired, the workpiece 150 may be grounded. Alternatively, the workpiece 150 may be independent of the current source or ground and the electrodes 152 and 154 each connected to opposite terminals of the current source. Each electrode can be used to produce a different coating upon the workpiece, e.g., first a "rough" coat at electrode 152, and then a "finish" coat at electrode 154, this by using different polarities on the two electrodes (where the workpiece is not used as the ground) or by using different potentials on the electrodes (where the workpiece serves as the ground).

In some cases it may be advantageous to submerge the workpiece 150 in a suitable liquid, the surface of the liquid being disposed immediately below the regions of contact between the electrodes and the workpiece. If desired, the workpiece and electrodes may be completely submerged in the liquid, in which case sufficiently lower current must be employed in order to prevent erosion. The liquid, which preferably comprises water, glycerine, sodium hydroxide and machine oil, may also include suspended carbide particles. The electrode may be constructed of carbide, steel, carbon, or other suitable metals.

In certain applicatioins, particularly where a thick continuous layer of carbide is desired with dimensional precision being less critical, it will be advantageous to employ a continuous current through the rotating electrode to the workpiece surface with which it is in tangential contact. This provides intense localized resistance heating. Here again the electrode can be formed of and thereby supply the carbide or other desired fusible coating material; however thick coatings can best be accomplished by depositing the coating material in the form of a slurry along the surface to be coated. A D.C., A.C., or high frequency current, i.e., from about 60 up to 500 amps, can be used to provide sufficient heat at the line of contact between the rotating sliding electrode and the workpiece. The diameter of the rotating electrode is preferably in the range of ¼ inch to ⅜ inch although larger as well as smaller diameters are also feasible. In general, the smaller the diameter of the electrode, the greater the current density at the region of contact; however the use of a large electrode enables the use of somewhat higher voltage without hazard of arcing. The optimum rotational speed of the electrode will depend on the diameter of the electrode and may be anywhere in the range of 40–10,000 r.p.m. In general, the faster the rotational speed, the smoother the finish attained. However, in each case the speed cannot be excessive or molten metal will be splattered and thrown away by the electrode.

As alluded to above, this continuous current technique, utilizing the rotating electrode, is particularly useful for certain applications in which additional heating, but not bulk heating, of the workpiece can be tolerated and a thicker coating is desired. Because the area through which the current flows is restricted to a line, by way of the tangential contact, the resistance is ample to achieve melting temperatures at the region of contact. As a result heat is continuously generated but is confined to the localized area of contact. While more heat may be generated than in the case of the contact-discharge technique, bulk-heating is nevertheless avoided because of the continuously changing line of contact resulting from the rotation of the electrode and its advancement over the workpiece surface. Small molten pools composed of the workpiece and carbide material will be disposed at points along the thin line of contact with the electrode. As the rotating electrode is translated in a direction parallel to the surface of the workpiece, the liquified pool of metal and carbide at each contacted point on the workpiece surface is immediately quenched and solidified as the rotating electrode moves away. The rotational sliding motion of the electrode with respect to the workpiece surface provides a wiping action of the liquified material and thereby increases the uniformity and decreases the porosity of the coating, all as heretofore described. In addition, the rotational motion prevents welding of the electrode to the workpiece. In certain cases it may be desirable to use an electrode of non-fusible material and without slurry, in which case the workpiece surface will be hardened by heat treatment alone. I have successfully employed slurries comprising powdered carbide material plus powder binder material such as cobalt, nickel or other suitable metal having a melting point below that of carbide. The current applied can then be such that the workpiece and slurry are heated at the region of contact to a temperature just above the melting point of the binder material but below that of the carbide. As a result, the carbide material is deposited in a matrix of binder material, the binder material serving to adhere the carbide particles to the workpiece surface. This can be used to solve a problem at times associated with deposition of substantial amounts of carbide, i.e., the effect upon the ductility of the workpiece surface. The binder material can be a much more ductile material than the carbide to afford the precise compromise between ductility and hardness desired. Also, this binder technique can be used with coarser grain carbide to attain rough or abrasive surfaces, if desired, since the carbide can be bonded to the surface without carbide fusion. It may be desirable, for certain applications, to first apply a thick coat of carbide with or without binder, by use of continuous current resistance heating between the rotating electrode and the workpiece and then apply a finish coat of carbide by a condenser discharge circuit to provide contact discharges between the rotating electrode and the surface.

Using the continuous current technique, the contacting annular surface of the rotating electrode may be smooth and continuous, as in FIGURE 1, or it may be of the interrupted type as shown in FIGURE 6. In addition to the rotational motion and the translational motion of the electrode parallel to the workpiece surface, it may also be desirable to move the electrode in vibrating fashion in the direction perpendicular or parallel to the workpiece surface. If a low voltage is employed (i.e., below 15 volts), arcing will not occur when either an interrupted type electrode or a vibratory motion is employed. If it is desired to use a higher voltage continuous current then, of course, continuous electrical contact should be maintained between the rotating electrode and the workpiece. An interrupted electrode can however be employed with higher voltage continuous current if the space between adjacent projecting segments on the electrode surface are sufficiently small so that at least one segment will be in contact with the workpiece surface at any given moment.

I have found that if, using a continuous current, an electrode is merely rolled over the workpiece surface, with no sliding motion, there will not be sufficient heat generated to bond the carbide to the workpiece unless a high amperage—upwards of 100 amps—is applied. However, when the electrode is driven rather than rolled, a much lower current may be used, apparently as a result of the increased resistance created as the electrode surface slides with respect to the workpiece surface.

As in the case where a condenser discharge or other pulsating or interrupted circuit is used, so with a continuous current circuit the rate of coating and the coating properties can be altered by using the workpiece as the anode and the electrode as the cathode. Also, rough and finish coating can be applied using multiple electrode arrangements as described above particularly with reference to FIGURE 15.

Whereas in the aforedescribed embodiments, such as that referenced to FIGURE 1, the sliding motion results from bringing a rotating electrode into generally tangential contact with the surface, in the hereinafter described methods the electrode is brought into contact with the surface and motion is imparted to the electrode relative to the surface so as to cause the sliding motion in a direction generally parallel to or in the plane of their area or line of contact, such being sometimes herein referred to, for brevity, as "parallel sliding." An electrode may be employed which makes contact with the work over an area which is greater than a point contact or a thin line tangential contact characteristics when a rotating electrode, as hereinbefore described, is used.

Use of the parallel sliding electrode provides several advantages. First, the equipment required for practicing the method is inherently simple. Standard production machines such as lathes, millers or planers may be converted to practice the process. No precision setup is required other than the imposition of a predetermined pressure as the electrode bears against the workpiece. In vibratory devices, for example, it is more difficult to maintain the required position relationship of the workpiece and the electrode. The constant contact between the workpiece and the electrode enabled by the present invention allows a variety of follower devices to be employed which may be simple in construction and will automatically follow the irregularities in a workpiece surface and compensate for electrode wear. If desired, several electrodes instead of only one may be used in the practice of the method. Because of the constant motion between the electrode and the workpiece, the danger of annealing the workpiece is greatly minimized and repeated discharges do not occur consecutively at the same point so as to excessively heat the workpiece and adversely affect its metallurgy.

The power supply which provides the short duration pulses of electrical energy between the parallel sliding electrode and the surface may take any of several forms. In one form which is preferred, a capacitor discharge circuit is employed. When the electrode contacts the surface such that discharge occurs, apparently the resistance between the surface and the electrode then rises so as to allow the capacitor to recharge to a value sufficient to create the next discharge. This process continues at a very high rate. Alternatively a power supply providing a sufficient potential difference to create an arc may be connected to the electrode and surface through an electrical or mechanical repetitive breaking or switching apparatus. The power supply then acts as its own pulse generator to repeatedly supply the electrode with sufficient voltage to create a luminous discharge and then immediately cuts off the current supply, the cycle then repeating itself. The selection of the power supply depends on the desired pulse duration which, for the practice of the invention, should preferably be such as to provide luminous discharges each having a duration of about 10 to 500 microseconds though particularly for large workpieces discharges of a duration up to 10,000 microseconds can be tolerated without creating excessive mass heating. The peak current of the pulses should be such as to provide the desired luminous discharges and can range from 20 to several hundred amps depending on the surface finish desired and the mass of the workpiece surface being treated.

When a pulsating power supply (i.e., one which provides pulses or interruptions independent of the electrode motion) is employed, the electrode need only be moved over the surface with sufficient speed to prevent overheating of the surface and in an appropriate manner so as to successively make the parallel sliding contact with all areas on the workpiece surface desired to be treated. It will be manifest that with such a power supply, the frequency of the pulses generated by the power supply is independent of the rate of movement of the electrode as distinguished from the system wherein the motion of the electrode triggers the pulsation in which case the frequency of the pulses is proportional to the rate of electrode movement. The resultant finish will be determined by the frequency duration and intensity of the current pulses and by the rate of motion of the electrode with respect to the surface. While no problem occurs in initiating the process with such a system, certain techniques must be employed to attain optimum desired results when using a power supply which relies on the electrode motion for the pulse generation. That is, when a non self-interrupted power supply is employed the generation of the discharge with the resultant desired intense localized short duration electrical heating is dependent upon the existence of minor irregularities on the workpiece surface which provide variation in electrical resistance between the electrode and the surface during the sliding motion so as to trigger the impulses. If the surface has sufficient initial irregularity, it is only necessary to slide the electrode with respect to the workpiece at a sufficient speed to create the desired luminous discharges. It has been determined that speeds in excess of approximately one inch per second are sufficient. The surface finish is inversely proportional to the relative motion rate and is also dependent on current density, pressure and area of contact. If the workpiece has a relatively fine initial finish, and a non-interrupted power supply is employed, it is necessary to either (a) prepare the surface by coating it with a conductive powder slurry, or (b) initially roughen the entire surface as by a suitable metalworking technique or by using a vibratory electrode to create scattered surface irregularities, or (c) create irregularities by moving the electrode transversely to the workpiece surface several times, into and out of contact therewith, and then sliding the electrode with respect to the workpiece with a reciprocating motion so as to move from an area having surface irregularities into a smooth area and then returning. In this manner the area of irregularities may be repeatedly extended until the entire surface is covered.

Similar irregularities are always present on the surface of the electrode which contacts the work. As the electrode is consumed, these irregularities continue to be created so that the electrode always initially contacts the work at one or more peaks. The passage of the potential difference between the electrode and the surface through these small area peaks causes such a high localized heat dissipation at these areas as to melt the surface and the electrode, if a fusible electrode is employed, and to cause deposition of the coating material on the surface. This produces electrical discharges with very minute flashes of light, in the nature of sparks, which are visible in the practice of the process although contact is substantially always maintained between the electrode and the surface, directly or through the carbide particles where powdered carbide is used.

As will be clear from the above, the method may be practiced either by use of a fusible electrode, by applying the fusible coating material to the workpiece surface in powder form as by previous painting of the surface with a powder slurry, or by a combination of both techniques.

The sliding motion may perform the function of moving the electrode with respect to the workpiece so as to reach successive areas of a surface to be coated, or it may take the form of a relatively short stroke reciprocation of the surface, or rotation about an axis perpendicular to the surface of the work super-imposed on a larger scale motion to cause the electrode to reach all points on the surface desired to be treated. In the case of a cylindrical workpiece, for example the interior of a tube, the sliding motion can be by rotation of a generally annular electrode about an axis parallel to that of the tube with accompanying progression of the electrode from one end toward the other of the tube.

Referring now to FIGURE 16, the apparatus shown therein finds special use in coating a surface which is other than flat. The electrode 220 is formed of a sintered carbide material such as tungsten carbide. It preferably has a flat end 222 which contacts a surface of a workpiece 224 which is to be coated. The electrode 220 may alternatively be formed of a non-fusible material such as tungsten and the surface of the workpiece 224 may be prepared by depositing a thin layer of fusible particles such as tungsten carbide deposited in the form of a slurry as previously described. Conductive powders formed from various other materials, for example chromium boride, either alone or in combination with metal carbide or the like, provide very advantageous results. Where non-conductive material is included in the powder it should, of course, have a sufficiently small grain size and be present in a sufficiently small proportion as to not render the mixture non-conductive.

Short duration pulses of electrical energy are provided between the workpiece 224 and the electrode 220 by conductors 226 which connect to the positive and negative terminals of power supply 228. The power supply 228 may take the form of those illustrated in FIGURES 24 and 25, which will subsequently be described, or a more conventional form. The negative terminal of the power supply 228 is connected to the workpiece 224 and the positive terminal connected to the electrode 220. Thus the electrode 220 acts as an anode and the workpiece 224 as the cathode. As mentioned previously, particularly where the carbide or other fusible material is supplied by a powder coating, it is often desirable to connect the circuit so that the electrode is the cathode and the workpiece the anode. When the electrical discharges occur, fused particles of the electrode material formed by the intense localized electrical heating are deposited on the workpiece surface and become coated thereon, this when a fusible electrode is employed. When carbide or other fusible powder is employed as is preferred, such powder is fused onto the surface by the intense localized electrical heating as the electrode passes thereover.

The electrode 220 is supported in a bracket 230 on the end of an arm 232 which is pivotally supported in a generally horizontal position about a vertically disposed support 234. A coil spring 236 is secured to the support 234 and has a straight portion connected to a point on the arm 232 between the support 234 and the bracket 230. In this manner the spring 236 acts to counterbalance the arm 232 towards a generally horizontal position and offer resistance to its pivoting excessively out of that position.

The support 234 is so disposed as to cause the electrode to contact the workpiece 224 with a predetermined pressure. That is, in this embodiment as in those shown in FIGURE 1 and in others hereinafter described, the electrode mounting arrangement is such that a portion of the weight of the mounting means is biased against the workpiece surface through the electrode to attain the desired pressure contact and maintain it during movement of the electrode over the surface albeit the surface may have irregular curvatures or the like. The workpiece 224 can be moved in the direction of the arrow in FIGURE 16, which is generally parallel to the area of contact between the electrode 220 and the workpiece. This motion may take the form of a reciprocation accompanied by a continuous motion, which may be in the plane perpendicular to the paper, so that the electrode is in continuous motion with respect to the workpiece and its successive points on the surface of the workpiece are brought into pressured contact with the electrode.

The embodiment of FIGURE 17 is a variation of FIGURE 16 wherein an electrode 238, which may be one of the same general nature as the electrode 220 in the embodiment of FIGURE 15, is supported so as to be slidable vertically within a horizontally disposed fixed arm 240. The lower end of the electrode 238 makes area contact with a workpiece 242. The upper end of the electrode 238 is connected to a power supply (not shown) by a cable 244 while the negative terminal of the power supply makes contact with a workpiece 242. The electrode 238 may be capped by a weight 246 which urges the electrode down against the workpiece. In this manner a contact in a moderate range of pressure is maintained between the electrode 238 and the workpiece 242. The workpiece 242 may be moved so as to slide with respect to the electrode 238 in a pattern similar to that in which the workpiece 224 is moved.

The embodiment of FIGURE 18 discloses an electrode 248 arranged in vertical sliding disposition within a horizontal holder 250. An adjustable coil spring 252, which is fixed on the arm 250 at a point displaced from the end thereof, makes contact with the upper end 256 of the electrode so as to maintain a downward pressure thereon which is in excess of the force of gravity. A workpiece 258 is maintained stationary in pressured contact with the end of the electrode 248 and the arm 250 is moved in a horizontal direction, which is parallel to the area of contact between the electrode 248 and the workpiece 258. The pressure of the spring 252 is maintained at such a value as to prevent excessive contact pressure between the workpiece 258 and the electrode 248 while yet preventing the electrode from becoming separate from the workpiece. The movement of the arm 250 is such as to cover the entire area of the workpiece 258.

FIGURE 19 is an end view of a variation in an electrode which may be substituted for the electrodes 220, 238 and 248 in FIGURES 16, 17 and 18, respectively. As seen in an end view, it employs a plurality of circular electrode members 260. These are retained in parallel spaced relationship at the end of an arm 262 which may represent the arm 232, 240 or 250 of the previous embodiments. The arm 262 may be conductive so as to electrically connect each of the members 260 together or it may be insulated so as to electrically separate each of the members 260. This has implications which will be discussed in connection with the power supplies of FIGURES 24 and 25.

In the multiple electrode device of FIGURE 19, a greater area may be covered than with an electrode having a smaller diameter than the total, yet the current density is maintained at a higher level than if one solid electrode were employed. By way of example, the five-electrode version illustrated in FIGURE 19 must make contact with a workpiece at least five points. If the arm 262 is moved so as to bring all points on the surface to be coated in contact with at least one of the electrodes, the results would be superior than those which might be achieved if one large-area electrode would be employed since this electrode may only actually contact one high point of the surface.

The embodiment of FIGURE 20 discloses the application of the invention to a circular workpiece 264. An electrode 266 is maintained in contact with a surface of the workpiece by a leaf spring 268 which is fixed with respect to the apparatus. The surface of the electrode 266 which is in contact with the workpiece 264 is shaped in the form of an arc having the same radius as the workpiece. The electrode 266 may initially have a flat end which would be worn into this arcuate shape. Such area contact distinguishes this embodiment from previously described embodiments (for example that shown in FIGURE 1) employing rotary motion but wherein the electrode makes a thin line tangential contact with the workpiece. Continuous rotation of the workpiece 264 will bring successive areas on its surface into contact with the electrode 266 and, if the workpiece has a greater axial length than the width of the electrode 266, a spiral electrode path may be employed to coat the entire surface.

The embodiments of FIGURES 21 and 22 disclose apparatus wherein a hollow electrode 270 makes an annular contact with the surface of a workpiece 272. The electrode is supported in a chuck 274 which is rotated about its axis by a motor 276, said axis being perpendicular to the surface being treated. A slip ring 278 allows continuous conductive contact to be made between the electrode 270 and a cable 280 connected to the positive terminal of the power supply (not shown). The negative cable 282 makes contact with the work. Either the work or the electrode support apparatus may be also moved linearly so as to bring the electrode into sliding contact with all points in the workpiece surface. An inert gas may be admitted through the central passage of the electrode or a fusible coating material in powder form may be introduced therethrough. As indicated previously the use of a reducing gas or an inert gas may provide advantageous variations in the nature of the coating formed.

FIGURE 23 illustrates a multiple electrode holder which may be used with the embodiments of FIGURES 16, 17, 18 or 20 wherein flat elongated electrodes 284 are utilized. The electrodes are arranged so that motion in a direction perpendicular to the longitudinal axis of the support arm 286 (in the plane of the paper) will contact a wide area on the surface to be coated. The electrodes may all be connected to one another and used with a conventional form of direct current capacitor discharge power supply or they may be insulated from one another and utilized with a power supply of a nature illustrated in FIGURES 24 and 25.

The use of the multiple electrodes provides several advantages. First, the electrodes, if arranged so as to cover the same area, may consecutively provide rough and fine coats over the area. The nature of the coating deposited by a particular electrode may be varied by adjusting the pressure which is exerted between it and the workpiece and/or the current density supplied to it. By making each of the electrodes 284 floatable within its holder 286, spring means may be applied to each so as to control the pressure exerted by each electrode on the workpiece surface.

In FIGURE 24 a workpiece 288 is schematically illustrated as being contacted by three insulated electrodes 290 which may be of the type shown in either FIGURES 19 or 23. Three capacitors 292, which are preferably of a variable variety, each have one of their sides connected to the negative terminal 294 of a direct current power supply which also makes contact with the workpiece 288. The other end of each of the capacitors 292 connects to one of the three electrodes 290 and to a positive terminal 296 of the power supply through three variable resistances 298. The resistance 298 and the capacitors 292 may be adjusted in an empirical manner in order to achieve the optimum coating of a particular base metal and fusion material.

The circuit of FIGURE 24 acts as a separate power supply for each of the electrodes 290 so that they act in an independent manner. When one of the capacitors 292 is fully charged and the electrode 290 is brought into contact with the workpiece 288, the capacitor discharges upon the electrode contacting the work. This causes sufficient current to pass through the small workpiece area contacted by the electrode to cause that area to fuse and become coated with the electrode material or other powder material deposited on the surface. The discharge of the capacitor creating the intense localized heat sufficient to cause the fusion is of course self-terminating. The resistance of the circuit then increases sufficiently for the capacitor to recharge until sufficient for the next discharge. By providing separate powering circuits for each of the electrodes, the number of discharges and fusion action per unit time may be multiplied. This creates a higher surface finish than would be attained with the use of a single electrode or electrodes contacting one another.

In the circuit of FIGURE 25, a plurality of insulated electrodes 300 are connected to a positive terminal 302 of power supply through variable resistances 304 while a workpiece 306 is connected to the negative terminal 308 of the power supply. Variable capacitors 310 are disposed between the electrodes and the negative line. Switches 312 are illustrated as breaking the circuit to each of the electrodes. These switches 312 may take the form of either mechanical or electronic devices which periodically interrupt the connection. Alternately, the arrangement of the capacitor power supply and the switches forms the equivalent of a high-power pulse generator such as is well known to the art. In the electronic version, the switches 312 may represent thyratron or controlled rectifiers. The switches 312 may operate at relatively high repetitive frequency, e.g., 200–50,000 c.p.s. or even higher. When they close they discharge the capacitor through the contact between the electrodes 300 and the workpiece 306. When they open they allow the capacitors to recharge. They may be operated in synchronism with one another or asynchronously. The synchronous, staggered operation is especially advantageous when all the capacitors are connected to one electrode or to a plurality of shorted electrodes. They have the advantage over the circuit of FIGURE 24 of allowing the capacitor to recharge without any current flow between the electrodes and the workpiece. The resistance 298 and 304 control the speed at which the capacitors charge. The capacitors themselves may be adjusted to values in the approximate range of 2 to 3000 microfarads in order to obtain optimum surface finishes.

The pressure which must be applied to the electrodes in all of these embodiments vary between the extreme values which produce a low ohmic contact with a workpiece and therefore prevent the relatively high resistance contact necessary, and the complete separation of the electrode from the surface which causes arcing if a sufficient potential difference is in existence. The exact values of these pressures are a function of the surface finish of both the workpiece and the electrode, the area of their contact and the potential difference applied between them The use of variable pressure elements allows an optimum adjustment to be made for each condition.

The potential difference which must be applied between the electrode and the surface is a function of the finish of both the surface and the electrode, the materials of which they are composed, and the area of contact. An upper limit is imposed by the distortion which accrues on the surface when a high bulk heat generation associated with large current densities occurs. A lower limit is set by the necessity of providing enough localized heat to create fusion of the materials. If, as preferred, a capacitor discharge circuit is used, or other circuit for repeated rapid discharges and breaking of the electric current, then currents in excess of those levels which would otherwise create an arc or undesirable bulk resistance are permissable.

The principals of the present invention are applicable to curved as well as generally flat surfaces and FIGURES 26, 27, 28 and 28A illustrate an electrode assembly which can be used with apparatus of the present invention to coat internal cylindrical surfaces of parts such as tubes or bushings. The assembly employs a plurality of coating tips 330 which may be formed of a fusible material such as tungsten, titanium or other carbide or a material such as carbon or tungsten. The tips 330 are disposed at the extreme ends of a plurality of elongated flexible prongs 332. The major dimension of the tips 330, which may be rectangular in shape, extends transversely to the disposition of the prongs 332.

The prongs 332 terminate at their opposite ends in a cylindrical, insulated base 334 which is attached to and may be rotated by a shaft 336. The shaft is connected to a suitable source of rotary power. The shaft 336 carries a plurality of flexible insulated conductors 342 (see FIGURE 28A) which connect the electrodes 330 to separate sections of a power supply of the type shown in FIGURES 24 and 25.

A cylindrical sleeve 337 which is supported on the base 334 (see FIGURE 13A) and extends over the prongs 332 has a collar 338 on its outer end which abuts the prongs. When the electrode is rotated by means of the shaft 336 centrifugal force tends to urge the electrodes 330 and the prongs 332 radially outward until the prongs abut the collar 338. The sleeve 337 may be adjusted with respect to the base 334 so as to extend the collar 338 along the prongs. By thus adjusting the collar the maximum radial extension of the tips 330 may be adjusted.

The electrode assembly of FIGURE 26 may be employed on a curved workpiece such as illustrated at 340 in FIGURE 27 or on the inner diameter of a cylindrical workpiece 343 as illustrated in FIGURE 28. When the electrode is rotated the tips 330 perform a sliding and hence wiping action on the surface of the workpiece. This action spreads the molten fusible material to improve the resultant workpiece finish. Alternatively the electrode assembly in the FIGURE 28 embodiment, for example, can be held still or be slowly advanced in the direction of its axis while the workpiece is rotated instead. The resiliency of the prongs 332 insures a smooth sliding contact and compensates for minor surface irregularities. The pressure exerted on the electrode is limited to a reasonable range by the resiliency of the prongs.

When a large radius concave surface such as that shown in FIGURE 27 is coated with an electrode assembly as shown in FIGURES 26-28A only one or two of the resilient electrodes contact the workpiece at a time. Therefore the electrodes may be connected to a common power supply. If all or most of the electrodes contact the surface at a given instant it is necessary that they be insulated from one another, as shown, to prevent their cumulative low resistance with respect to the workpiece from shorting the power supply.

FIGURE 29 discloses an electrode assembly in which the electrode may be rotated about an axis perpendicular to the workpiece surface. In FIGURE 29 a cylindrical block 350 has a plurality of vertical holes which support elongated electrodes 352. The electrodes are preferably disposed within the block 350 so that they may move axially with respect thereto. Alternatively, they may be fixed. Flexible conductors 354 connect the upper ends of the electrodes 352 to a conductive plate 356. The holder 350 is rotated by a central shaft 358 which is disposed in a chuck 360 and powered by a suitable rotating source 362. If the electrodes are separately powered by a power supply of the type shown in FIGURE 25 a plurality or slip rings 364 may be used to individually connect the electrodes 352.

In variations on this embodiment spring tension may be used to pressure the electrodes 352 against a workpiece 366. The apparatus of FIGURE 29 is suitable for coating flat surfaces without interruptions or with interruptions smaller than the size of the electrodes. The electrodes are spun about the vertical axis to provide the relative sliding motion between the electrodes and the workpiece surface. For effective operation there must be sufficient speed of rotation, relatively light pressure and an area of surface contact which is a function of the current density. Since the electrical discharges with attendant intense localized heating, result from the spinning of the electrodes whereby they slide over its surface, the driving shaft or spinning center can be moved in relation to the surface at any speed, very slow if desired, or it can be left stationary.

FIGURE 30 illustrates apparatus which may be used with any of the electrodes previously illustrated in order to position the electrode and move it with respect to an irregularly shaped workpiece. The entire assembly is supported by a block 370 which carries a pinion 372 with a horizontal axis. A rack 374 engages a pinion and supports a linear actuator 376 which may be of a mechanical or electric variety by means of an adjustable angular coupling 378. The shaft 380 of the linear actuator 376 pivotably retains the electrode supporting arm 382. The arm 382 pivotably retains the electrode supporting arm 382. The arm 382 contains a plurality of attachment points 386 to which the shaft 380 may be joined. A coil spring 384 biases the rod 380 against the workpiece. A weight 388 disposed at one end of the arm 382 acts to counter-balance the assembly. Several arms may be independently supported from the rod 380.

FIGURE 31 shows an embodiment wherein the contacting surface of the electrode is generally spherical. A source of rotary power such as an electric motor 390 has a shaft 392 to which the electrode 394 is connected for rotation thereby while in contact with the workpiece 396. The motor is connected by a pivot joint 398 to a suitable support 400 which can incorporate means, not shown, for raising or lowering the motor. A weight 402 threadedly engaged with a rod on the back of the motor allows balancing or adjustment of the distribution of weight about the pivot joint 398. A spring (not shown) around the pivot joint biased between the support and the motor can be used so that the electrode continuously contacts the workpiece with the desired pressure. The spherical shape of the electrode provides a small area or substantially point contact with the workpiece and the electrode can be moved over the surfave, with accompanying pivotal movement of the axis of rotation if desired, without changing the small size of the area of contact.

Figure 32:
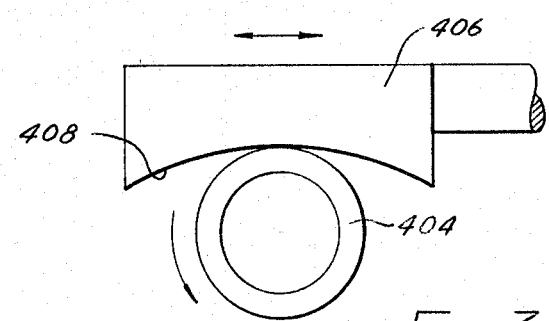
FIGURE 32 shows an embodiment of the invention wherein the workpiece is rotated with respect to a reciprocating electrode.

FIGURE 32 illustrates another embodiment of the invention wherein rotary motion of a cylindrical workpiece is utilized. In this embodiment, 404 is the workpiece which is rotated as indicated and 406 is the electrode which is reciprocated as indicated. The contacting surface 408 of the electrode is arcuate but with a radius of curvature greater than that of the workpiece surface. If the workpiece is a long tube, the entire surface thereof may be treated by advancing it past the reciprocating electrode in the direction of the longitudinal axis of the workpiece. If desired the electrode contacting surface 374 may be flat instead of concave, in which event there will be a thinner line of contact with the workpiece, or it may be convex to provide an even thinner line of contact. The reciprocatory motion of the electrode assures maintenance of the desired predetermined line area of contact irrespective of electrode wear. This desirable feature of maintaining the size of the contact area constant despite electrode wear can, of course, also be accomplished by using the rotating electrode arrangement as previously described with reference, for example, to FIGURES 2 and 8.

Figure 33:
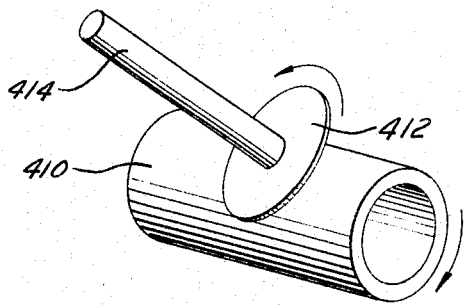
FIGURE 33 is a perspective view of an embodiment of the invention wherein both the workpiece and the electrode are rotated but on different axes.

In FIGURE 33 there is shown another embodiment wherein a cylindrical workpiece is treated in accordance with the invention, here with a rotating electrode. The tubular workpiece is rotated about its longitudinal axis as shown and a disc shaped electrode 412 is rotated by its drive shaft 414 in the direction shown, the axis of rotation of the electrode being perpendicular to the axis of rotation of the workpiece. The rotation of the electrode assures against a concavity being worn into the electrode surface and provides the aforementioned desirable feature, i.e., maintenance of the desired linear contact between the electrode and the workpiece. If desired, the disc shaped electrode can additionally be reciprocated in the plane of the disc.

Figure 34:
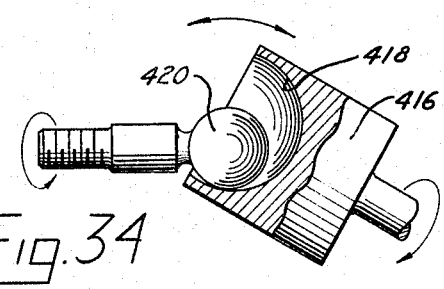
FIGURE 34 shows an embodiment of the invention wherein a concave spherical electrode is used.

FIGURE 34 shows an embodiment of the invention wherein the electrode 416 has a concave spherical surface 418 which contacts a spherical workpiece, in this instant the ball 420 for a ball joint assembly. The radius of the spherical electrode is considerably larger than that of the workpiece ball 420 and during the treatment the ball is rotated about the axis of its attached stud, as shown, while the electrode is also rotated and at the same time pivoted, as indicated. Hence, the rotating electrode makes contact during the pivotal motion with all portions of the ball and wear of the spherical surface of the electrode is uniform, the size of the area of contact remaining substantially uniform.

As alluded to above, for example with respect to FIGURE 1, the rotary sliding motion of the electrode can, if desired, be interrupted by a reciprocatory motion generally perpendicular to the workpiece surface. To further illustrate this, the rotary motion of the electrode 412 of FIGURE 33 can, if desired be combined with perpendicular reciprocation. To further illustrate such combined motions, the rotational motion of the electrode in FIGURE 1 can, if desired, be accompanied not only by a reciprocatory motion perpendicular to the workpiece surface but also by a reciprocatory motion parallel to the workpiece surface in the direction of the axis of rotation. Of course there can be further superimposed over these motions, movement of the electrode or workpiece to cause the electrode to traverse all portions of the workpiece surface desired to be coated. The combination of a rotary electrode motion or a rapid reciprocatory sliding electrode motion, or both, together with a reciprocatory electrode motion perpendicular to the surface, plus motion to cause the desired workpiece traversal finds utility, for example, in coating or treating workpiece edge portions, particularly in that such combined motions better assure uniform electrode wear with resultant uniformity of line or area contact.

Hence, it will be understood that while the invention has been specifically described with reference to particular embodiments thereof, various modifications may be made, and features described with reference to one embodiment may be used with other embodiments, all within the spirit and intended scope of the claims which follow.

The embodiments of the invention in which an exclusive property or privilege is claimed are defined as follows:

1. A method for surface treating a heat-fusible surface of a workpiece comprising sliding an electrode with respect to and in contact with said surface and passing short duration pulses of electrical energy between said electrode and said surface during said sliding contact, said pulses and the size of the area of said contact between said electrode and said surface being such as to provide intense localized electrical heating sufficient to cause instantaneous fusion of portions of said surface in the areas thereof contacted by said sliding electrode, there being a heat-fusible material applied to said surface, said material becoming bonded to said workpiece surface by said intense localized electrical heating.

2. A method as set forth in claim 1 wherein said electrode is made of and thereby supplies at least a portion of said heat-fusible material.

3. A method as set forth in claim 1 wherein at least a portion of said heat-fusible material is a powder applied to said workpiece surface prior to sliding said electrode over said surface.

4. A method as set forth in claim 1 wherein said electrode has a generally annular surface and is rotated, the contact of said workpiece surface with said electrode being generally tangential with said annular surface of said electrode.

5. A method as set forth in claim 1 wherein said contact between the electrode and workpiece surface is generally linear.

6. A method as set forth in claim 1 wherein said surface is generally cylindrical and wherein the sliding motion of said electrode with respect to said surface is circular.

7. A method as set forth in claim 1 wherein there is relative rotary motion between said electrode and said workpiece and wherein the shape and sliding motion of said electrode with respect to said workpiece surface are such that the size of the area of contact of said electrode with said workpiece surface remains substantially constant as said electrode wears.

8. A method as set forth in claim 1 wherein the sliding motion of said electrode is generally parallel to the region of the workpiece surface with which the electrode is in contact.

9. A method as set forth in claim 4 wherein the axis of rotation of said electrode is inclined at an angle other than perpendicular to said workpiece surface.

10. A method as set forth in claim 1 wherein at least a portion of said sliding motion of said electrode is reciprocatory and wherein said reciprocatory motion is accompanied by additional motion between said electrode and said workpiece to cause said electrode to contact all portions of the workpiece surface desired to be treated.

11. A method as set forth in claim 1 wherein said pulses are from a circuit having characteristics of a condenser discharge circuit.

12. A method as set forth in claim 3 wherein the electrode constitutes the cathode in the application of the pulses therebetween.

13. A method for treating an electrically conductive surface comprising sliding an electrode of heat fusible material with respect to and in substantially continuous contact with said surface and passing a pulsating electric current between said electrode and said surface to create a plurality of electrical discharges during said sliding contact with resultant intense localized electrical heating of said surface sufficient to cause localized fusion thereof, said discharges also causing fusion of the contacting portion of said electrode such that the electrode material is fusion bonded to said surface by said intense localized electrical heating.

14. A method for treating a metal surface comprising sliding a plurality of electrodes with respect to and in contact with said surface while applying short duration pulses of electrical energy between each of said electrodes and said surface during said sliding contact to create intense localized electrical heating of said surface, said intense heating occurring in the presence of a material which becomes bonded to said surface by said intense heating to form a coating thereon.

15. A method as set forth in claim 14 wherein the electric current applied has the characteristics of a capacitor discharge.

16. A method as set forth in claim 14 wherein at least one of said electrodes imparts predetermined properties to the applied coating which are different than the properties imparted to the coating by another of said electrodes.

17. A method as set forth in claim 14 wherein at least one of said electrodes constitutes the cathode in the application of the pulses therebetween.

18. A method for bonding a fusible electrically conductive material to a metal surface comprising applying particles of the fusible material to the surface and bringing an electrode into sliding contact with the particles of fusible material, short duration pulses of electrical energy being passed between said contacting electrode and said surface to create electrical discharges with resultant intense localized heating whereby said material is bonded to said surface.

19. A method as set forth in claim 18 wherein said particles are applied as a thin layer thereof over the surface prior to bringing said electrode into contact with said surface.

20. A method as set forth in claim 19 wherein said layer is applied as a slurry consisting of said particles and a vaporizable liquid.

21. A method as set forth in claim 18 wherein the size of said particles is in the range of 150 to 450 mesh.

22. A method as set forth in claim 18 wherein said particles are applied to said surface by feeding them to the surface immediately prior to contact by said electrode.

23. A method as set forth in claim 18 wherein said electrode is rotated to provide at least a portion of said sliding contact.

24. A method as set forth in claim 18 wherein said material is a metal carbide.

25. A method as set forth in claim 18 wherein said pulses are capacitor discharges.

26. A method as set forth in claim 18 wherein said electrodes constitutes the cathode in the application of said pulses.

27. A method for forming a bonded layer of fusible electrically conductive material on the surface of a metal article comprising applying to the surface a conductive material which forms at least part of the fusible material of the layer desired to be formed, and then passing an electrode over and in at least periodic contact with said applied conductive material while passing short duration pulses of electrical energy between said contacting electrode and said surface to create electrical discharges with resultant intense localized heating.

28. In a method of adhesively depositing on a fusible electrically conductive surface a fusible coating composition, by producing by means of a suitable electric circuit short duration pulses of electrical energy to provide electrical discharges between said surface and an electrode disposed in contact with said surface—the improvement comprising: providing a sliding motion between said electrode and said surface during said electrical discharges.

29. In a method of impregnating a fusible electrically conductive surface with a coating composition introduced onto said surface, by repetitively producing by means of a suitable electric circuit short duration pulses of electrical energy to provide instantaneous electrical discharges between said surface and an electrode of suitable composition—the improvement comprising: contacting a region of said electrode with said surface at a pressure which is adapted to provide a predetermined electrical resistance between said electrode and said surface, and continually sliding said contacting surface with respect to said electrode.

30. A method as set forth in claim 29 wherein said electrode comprises said coating composition whereby at least a portion of the composition introduced onto said surface is introduced by said electrode.

31. A method for treating a metal workpiece surface comprising contacting said surface tangentially with a rotating generally annular shaped electrode surface such that there is a sliding motion of said rotating electrode surface with respect to said workpiece surface, moving said rotating electrode surface with respect to said workpiece surface to advance said tangential contact over all portions of said workpiece surface desired to be treated, and simultaneously passing an electric current between said rotating electrode surface and said workpiece surface to create intense localized heating of the portions of said surface contacted by said electrode.

32. A method as set forth in claim 21 wherein said current has the characteristics of a capacitor discharge.

33. A method as set forth in claim 21 wherein said current is continuous.

34. A method as set forth in claim 21 wherein a hard heat fusible material is introduced onto said surface and is bonded to said surface by said treatment.

35. A method as set forth in claim 34 wherein at least a portion of said material is introduced onto said surface as a powder.

36. A method as set forth in claim 21 wherein said current is a high frequency current.

37. In a method of adhesively depositing on a fusible electrically conductive surface a fusible coating composition, by producing by means of a suitable electric circuit short duration pulses of electrical energy to provide electric discharges between said surface and an electrode which is in contact with said surface and which comprises at least a portion of the aforesaid fusible coating composition, said discharges occurring through the region of contact—the improvement comprising: rotating said electrode while in contact with said surface.

38. A method of adhesively depositing on a fusible electrically conductive surface a fusible coating composition comprising: producing by means of a suitable electric circuit short duration pulses of electrical energy to provide electric discharges between said surface and an electrode having a surface which is in contact with said workpiece surface and which comprises at least a portion of the aforesaid fusible coating composition, said discharges occurring through the region of contact, relative rotation being provided between said electrode and said surface so that there is a wiping motion therebetween with the region of contact continuously changing.

39. In a method of impregnating a fusible electrically conductive surface with a fusible coating composition by repetitively producing by means of a suitable electric circuit short duration pulses of electrical energy to provide instantaneous electric discharges between said surface and an electrode of suitable composition—the improvement comprising: contacting a region of said electrode with said surface at a pressure which is adapted to provide a predetermined electrical resistance between said electrode and said surface, and at the same time continually moving said contacting region of said electrode with respect to said surface with a motion possessing a substantial component parallel to said surface in the region of contact, and wherein said contacting arrangement of said electrode during said motion subjects the aforesaid coating composition, while in a plastic state upon said surface, to a wiping action.

40. In a method of impregnating a fusible electrically conductive workpiece surface with a coating composition introduced onto said surface, by repetitively producing by means of a suitable electric circuit short duration pulses of electrical energy to provide instantaneous electric discharges between said surface and an electrode having a generally annular surface—the improvement comprising: transmitting rotary motion to said electrode to cause it to rotate while said annular surface is in tangential contact with said workpiece surface.

41. In a method of impregnating a fusible electrically conductive surface with a coating composition introduced onto said surface, by repetitively producing by means of a suitable electric circuit short duration pulses of electrical energy to provide instantaneous electric discharges between said surface and an electrode which is formed of and thereby introduces at least a portion of said coating composition—the improvement comprising: rotating said electrode while contacting it with said surface at a pressure which is adapted to provide a predetermined electrical resistance between said electrode and said surface, the extent of said contact between the electrode and said surface being limited at any one instant of time substantially to a plurality of line segments.

42. In a method of adhesively depositing on a fusible electrically conductive workpiece surface a fusible coating composition introduced into said surface, by producing by means of a suitable electric circuit short duration pulses of electrical energy to provide electric discharges between said surface and an electrode having a generally annular surface disposed in contact with said surface—the improvement comprising: rotating said electrode about an axis which is at an angle other than perpendicular to said surface in the region of said electrical discharges while the annular surface of said electrode is in contact with said workpiece surface.

43. A method for surface hardening a fusible electrically conductive workpiece surface comprising rotating an electrode having a generally annular surface relative to said workpiece while contacting said annular surface generally tangentially with said workpiece and applying an electric current between said electrode and said workpiece surface to create intense instantaneous localized heating in the region of contact therebetween, said annular surface having circumferentially spaced recessed portions providing interruptions in said contacting annular surface.

44. In a method of impregnating a fusible electrically conductive workpiece surface with a coating composition introduced onto said surface, by repetitively producing by means of a suitable electric circuit short duration pulses of electrical energy to provide instantaneous electric discharges between said surface and an electrode—the improvement comprising: rotating said electrode while contacting a generally annular surface thereof substantially tangentially with said workpiece surface, and concurrently maintaining between said electrode and said workpiece surface relative translational motion parallel to the workpiece surface to thereby contact with said electrode all areas of said workpiece surface desired to be treated, said annular surface having circumferentially spaced recessed portions therein providing interruptions in said contacting annular surface.

45. A method of impregnating a fusible electrically conductive surface with a fusible coating composition, comprising: rotating an electrode by transmitting rotary motion thereto while contacting it with said surface, the extent of said contact between the electrode and said surface being limited at any one instant of time substantially to a plurality of line segments, at least the contacting portion of said electrode being formed of said fusible composition so as to be capable of being transferred and fusion-welded to said surface, additional of said fusible coating composition being present on said surface in its solid unfused state, and impressing between said electrode and said surface an electric potential suitable for creating intense localized heating at the region of contact between said electrode and said surface with resultant instantaneous welding of the fusible coating composition to said surface.

46. A method of impregnating a fusible electrically conductive surface with a coating composition, comprising: rotating an electrode by transmitting rotary motion thereto while contacting it with said surface, the extent of said contact being limited substantially to a line; at least a portion of said coating composition being introduced onto said surface in the form of a powder and said electrode and surface being in an electrical circuit having the characteristics of condenser discharge so as to produce, upon contact between said electrode and said surface, instantaneous electrical discharges through the region of contact.

47. In a method of impregnating a fusible electrically conductive surface with a coating composition introduced onto said surface, by repetitively producing by means of a suitable electric circuit short duration pulses of electrical energy to provide instantaneous electric discharges between said surface and an electrode—the improvement comprising: rotating said electrode while contacting it with said surface and concurrently subjecting said electrode to a vibrational motion possessing a substantial component perpendicular to said surface at the region of contact.

48. In a method of impregnating a fusible electrically conductive surface with a coating composition by repetitively producing by means of a suitable electric circuit short duration pulses of electrical energy to provide instantaneous electric discharges through points of contact between said surface and an electrode of suitable composition, without substantial bulk heating of said surface—the improvement comprising: introducing at least a portion of said coating composition as a powder between said surface and said electrode.

49. In a method of impregnating a fusible electrically conductive surface with a coating composition by repetitively producing by means of a suitable electric circuit short duration pulses of electrical energy to provide instantaneous electric discharges through points of contact between said surface and an electrode—the improvement comprising: introducing at least a portion of said coating composition as a powder between said surface and said electrode, and rotating said electrode while contacting it with said surface to provide a wiping action between said electrode and said surface.

50. In a method of adhesively depositing on a fusible electrically conductive surface a fusible coating composition introduced onto said surface, by producing by means of a suitable electric circuit a potential difference operative to generate electric discharges between said surface and an electrode moved with respect to said surface while in substantially continuous contact therewith, said discharges occurring through the region of contact—the improvement comprising: providing rapid timed interruptions of the electric potential difference existing between said electrode and said surface.

51. In a method of impregnating a fusible electrically conductive surface with a coating composition by repetitively producing by means of a suitable electric circuit short duration pulses of electrical energy to provide instantaneous electric discharges between the regions of contact of said surface and an electrode which repeatedly makes contact with said surface by a vibrating motion thereby to cause intense localized heating without substantial bulk heating of said surface—the improvement comprising: introducing at least a portion of said coating composition as a powder between said surface and said electrode.

52. A method of coating a fusible electrically conductive surface with a surface hardening material comprising: providing said material as a finely divided powder on said surface, and transmitting rotary motion to an electrode to cause the electrode to rotate in sliding contact with said powder-covered surface, said electrode and surface being in an electrical circuit including a source of electrical energy and a capacitor disposed across said electrode and surface whereby instantaneous electrical discharges are created between said electrode and said surface, said discharges fusing said particles to said surface and producing a bonded coating thereof on said surface.

53. A method of coating a fusible electrically conductive surface with carbide comprising: providing carbide as a finely divided powder on said surface, rotating an electrode in sliding contact with said powder-covered surface, and moving said rotating electrode over said surface so as to cause said electrode to contact all of said surface desired to be coated, said electrode and surface being in an electrical circuit including a source of electrical energy and a capacitor disposed across said electrode and surface whereby instantaneous electrical discharges are created between said electrode and said surface, said discharges fusing said carbide particles to said surface and thereby producing a bonded coating of carbide on said surface.

54. In the process of impregnating a fusible electrically conductive surface of a workpiece with a coating composition by bringing an electrode into sliding contact with the surface and applying short duration pulses of electrical energy between said electrode and said surface suitable for creating instantaneous electrical discharges through the region of contact, the improvement which consists of providing carbon, in addition to any carbon in said electrode and in said workpiece composition, in said region of contact.

55. In a method of impregnating a fusible electrically conductive surface with a coating composition introduced onto said surface, by repetitively producing by means of a suitable electric circuit short duration pulses of electrical energy to provide instantaneous electric discharges between said surface and an electrode of suitable composition, the improvement comprising: rotating said electrode while contacting it with said surface, and providing linear motion of said rotating electrode in the direction parallel to said surface, said linear motion being independent of said rotational motion.

56. A method of impregnating a fusible electrically conductive surface with a coating composition, comprising: introducing said coating composition onto said surface, rotating an electrode while contacting it substantially tangentially with said surface, said electrode and surface being in a condenser discharge type circuit so as to produce instantaneous electrical discharges through the region of contact; and providing linear motion of said rotating electrode with respect to said surface in the direction parallel to said surface, said linear motion being independent of said rotational motion.

57. The method set forth in claim 37 and wherein at least a portion of said coating composition is introduced in the form of a slurry of powder in vaporizable liquid.

58. The method of surface hardening a metal surface comprising: contacting said surface with an electrode said electrode and surface being in an electrical circuit having the characteristics of condenser discharge circuit so as to produce instantaneous electrical discharges through the region of said contact, said electrode being continually rotated during said electrical discharges.

59. In a method of impregnating a fusible electrically conductive surface with a coating composition introduced onto said surface, by repetitively producing by means of a suitable electric circuit having the characteristics of a capacitor discharge circuit, short duration pulses of electrical energy to provide instantaneous electrical discharges between said surface and an electrode of suitable composition—the improvement comprising: bringing said electrode into contact with said surface and sliding said electrode with respect to said surface in a direction parallel to their contacting area during said discharges.

60. In a method of impregnating a fusible electrically conductive surface with a coating composition introduced onto said surface, by repetitively producing by means of a suitable electric circuit having the characteristics of a capacitor discharge circuit, short duration pulses of electrical energy to provide instantaneous electrical discharges between said surface and an electrode of suitable composition—the improvement comprising: contacting an area of said surface with said electrode at a pressure which is adapted to provide a predetermined electrical resistance between said electrode and said surface, continually reciprocating said electrode with respect to said workpiece in a line parallel to their area of contact during said discharges, and providing a second motion of said electrode with respect to said workpiece adapted to bring said electrode into contact with all points on the surface which are to be coated.

61. In a method of impregnating a fusible electrically conductive surface with a fusible coating composition, by repetitively producing by means of a suitable electric circuit short duration pulses of electrical energy to provide instantaneous electrical discharges between said surface and an electrode of said coating composition—the improvement comprising: supporting said electrode with respect to said surface in such a manner that a predetermined pressure which is adapted to provide a predetermined electrical resistance is exerted between said electrode and said surface, and moving said electrode with respect to said surface in a direction parallel to their area of contact in such a manner as to maintain the predetermined pressure between the two.

62. In a method of impregnating a fusible electrically conductive surface with a fusible coating composition by repetitively producing by means of a suitable electric circuit short duration pulses of electrical energy to provide instantaneous electrical discharges between said surface and an electrode—the improvement comprising: introducing at least a portion of the fusible composition onto said surface by depositing a coating of said fusible composition on said surface, contacting such coated surface with said electrode at a pressure which is adapted to provide a predetermined electrical resistance between the two, and sliding said electrode with respect to said surface in a direction parallel to their contacting area.

63. In a method of impregnating a fusible electrically conductive annular surface with a coating composition introduced onto said surface, by repetitively producing by means of a suitable electric circuit short duration pulses of electrical energy to provide instantaneous electrical discharges between said surface and an electrode— the improvement comprising: contacting said surface with said electrode and rotating said surface so as to bring all areas of said surface desired to be impregnated into sliding contact with said electrode.

64. In a method for treating an electrically conductive surface to impart hardness thereto, the step comprising moving an electrode over said surface in contact therewith while applying short duration pulses of electrical energy to cause a plurality of sequential electrical discharges between said electrode and said surface with resultant instantaneous fusion at the areas of contact, the frequency of said electrical discharges being directly proportional to the rate of movement of said electrode over said surface.

65. In a method for treating a heat fusible electrically conductive surface to impart hardness thereto, the step comprising sliding an electrode of a hard heat fusible material over the areas of said surface desired to be treated while applying short duration pulses of electrical energy between said electrode and said surface, said electrode being slid over said surface at such speed and being biased against said surface at such pressure as to result in luminous short duration, intense heat creating discharges of electric current between said electrode and said surface sufficient to provide localized fusion of said surface and said electrode material in the areas thereof in contact, said motion and said discharges being continued until the desired hardness is imparted to said areas.

66. A method for treating a metal surface comprising: sliding an electrode over said surface while applying short duration pulses of electrical energy to said electrode to thereby create luminous short duration intense heat creating electrical discharges between said electrode and said surface to cause instantaneous fusion at the area of contact, the frequency of at least some of said pulses being independent of the rate of movement of said electrode.

67. Surface treating apparatus comprising an electrode, means for rotating said electrode in contact with an electrically-conductive surface, means for supplying an electrical potential therebetween adapted to produce electrical discharges, means for subjecting said electrode to vibrational motion having a substantial component perpendicular to said surface in the region of contact; and means for moving the electrode with respect to the surface in a direction generally parallel to the surface so as to successively bring the rotating electrode into contact with various portions of the surface.

68. An apparatus for impregnating a fusible electrically-conductive surface with a coating composition, comprising: means for introducing said coating composition onto said surface, an electrode; means for rotating said electrode in substantially tangential contact with said surface; means for exerting pressure between said electrode and said surface adapted to provide a predetermined electrical resistance between said electrode and said surface, and electric circuit means adapted for repetitively producing instantaneous electric discharges between said electrode and said surface through the region of contact therebetween as said electrode is rotated.

69. Apparatus for imparting hardness to a fusible electrically conductive workpiece surface comprising: an electrode assembly including an electrode arranged for contact with said workpiece surface, an electrical power source to provide repeated electric discharges between said workpiece surface and said contacting electrode, and swivel mounting means mounting said electrode assembly for pivotal movement, said electrode assembly being urged into pivotal movement about said swivel mounting in such direction as to cause contact between said electrode and said surface substantially with a predetermined pressure regardless of irregularities and curvature of said surface.

70. An apparatus for imparting hardness to a fusible electrically conductive peripheral surface of a cylindrical workpiece comprising: means for supporting said workpiece for rotation about its axis; at least one cylindrical electrode supported for rotation about its own axis extending parallel to the axis of said workpiece, said workpiece and electrode contacting along their peripheral surfaces, the extent of said contact being limited at any time substantially to a line; means for rotating said workpiece and electrode about their respective axes in such manner as to provide a relative sliding motion therebetween and electric circuit means adapted for repetitively producing instantaneous electrical discharges between said electrode and said workpiece through said line of contact.

71. Apparatus as set forth in claim 70 including means for introducing a hard heat fusible material adjacent said line of contact.

72. An apparatus for surface hardening a fusible electrically-conductive surface, comprising: an electrode having a hub portion and a plurality of spaced apart radially outwardly projecting electrode contactors mounted on said hub, each of said electrode contactors having substantial bending resiliency, means for rotating said electrode about an axis spaced from said surface a distance sufficient to cause contact between the tips of each of said electrode contactors and said surface, and electric circuit means for repetitively producing instantaneous electric discharges between said electrode and said surface through the region of contact therebetween as said electrode is rotated.

73. An apparatus for surface hardening a fusible electrically-conductive surface, comprising: an electrode having a hub portion and a plurality of spaced apart radially outwardly projecting electrode contactors mounted on said hub, each of said electrode contactors having substantial bending resiliency, means for rotating said electrode about an axis spaced from said surface a distance sufficient to cause non-tangential contact between the tips of said electrode contactors and said surface with substantial bending of said resilient contactors thereby creating a wiping motion of said electrode contactors against said surface, and electric circuit having the characteristics of a condenser discharge circuit for repetitively producing instantaneous electric discharges between said electrode and said surface through the region of contact therebetween as said electrode is rotated.

74. Apparatus for treating an electrically conductive surface to impart hardness and wear resistance thereto comprising: electrode arranged for sliding engagement with said surface, a power supply having the characteristics of a capacitor discharge circuit connected to said electrode and for connection to said workpiece to provide short duration pulses of electrical energy between the two to create intense localized heating of the areas of said workpiece contacted by said electrode, means for applying pressure between said electrode and said surface, and means for causing said electrode to slide with a reciprocatory motion with respect to said workpiece in a direction generally parallel to their area of contact.

75. Apparatus for treating an electrically conductive surface comprising: a plurality of electrodes, a support operative to retain such electrodes electrically insulated from each other, at least one electrical power supply having the characteristics of a capacitor discharge circuit including connecting means whereby short duration pulses of electrical energy can be passed between each of said electrodes and said surface independently of the other electrodes, and means for bringing said electrodes into sliding contact with said surface.

76. Apparatus for bonding a heat fusible coating composition to a heat fusible electrically conductive surface comprising: a plurality of electrodes, a current power supply including a plurality of capacitors, connections between said capacitors, said electrodes and said workpiece such as to dispose at least one of said capacitors electrically across each of said electrodes and said workpiece, means for bringing said electrodes into contact with said surface and for moving said electrodes while in contact with said surface thereby to impart a sliding motion.

77. Apparatus for impregnating a fusible electrically conductive surface with a coating composition comprising: a plurality of electrodes; a support operative to retain said electrodes in an electrically insulated relationship with respect to one another, a direct current power supply including a plurality of sections equal to the number of electrodes, each section including at least one capacitor in series with a breaker device, connecting means operative to dispose one of said power supply sections between each of said electrodes and said surface; means for providing movement between said electrodes and said surface while there is contact therebetween; and means for repeatedly actuating said breakers so as to create electrical discharges between said electrodes and said surface.

78. Apparatus for treating the surface of a metal workpiece to impart hardness and wear resistance thereto comprising a source of rotary power, an electrode connected to said source of rotary power for rotation thereby while said electrode is in contact with said workpiece surface, and a source of electric current having the characteristics of a capacitor discharge connected to said electrode and for connection to said workpiece to cause electrical discharges to occur between said electrode and said workpiece surface upon contact therebetween, said current source providing intense localized heating of portions of the area of said workpiece surface contacted by said rotating electrode without substantial removal of said portions.

79. Apparatus as set forth in claim 78 wherein said electrode is connected to said source of rotary power by a shaft which has a flexible section therein.

80. Apparatus as set forth in claim 78 wherein the contacting surface of said electrode is generally annular shaped and is arranged for tangential contact with said workpiece surface.

81. Apparatus as set forth in claim 78 wherein said electrode has a generally conical surface which contacts said workpiece surface.

82. Apparatus as set forth in claim 78 wherein the contacting portion of said rotating electrode is tubular shaped.

83. Apparatus as set forth in claim 78 wherein the contacting surface of said electrode is generally annular with recessed portions providing interruptions therein.

84. Apparatus as set forth in claim 78 wherein the axis of rotation of said electrode is substantially perpendicular to said workpiece surface.

85. Apparatus as set forth in claim 78 which additionally includes electrode support means which provides relatively uniform contact pressure between said electrode and said workpiece surface.

86. Apparatus for treating a cylindrical surface of a metal workpiece member to impart hardness and wear resistance thereto comprising an electrode member arranged for contact with said cylindrical surface of said workpiece member, means for rotating at least one of said members about an axis generally parallel to said cylindrical surface whereby said electrode member slides in a circumferential direction in contact with said cylindrical surface, and an electrical power source for applying short duration pulses of electrical energy across said electrode member and said workpiece member to create intense localized heating of the areas of said cylindrical surface contacted by said electrode.

87. Apparatus as set forth in claim 86 wherein said electrode member rotates in a plane generally perpendicular to the axis of curvature of said cylindrical surface.

88. Apparatus as set forth in claim 86 wherein said electrode member has a plurality of circumferentially spaced contacting surfaces.

89. Apparatus as set forth in claim 86 including means for moving one of said members with respect to the other in a direction parallel to the axis of curvature of said cylindrical surface.

90. Apparatus as set forth in claim 86 wherein said electrical power source comprises a circuit having the characteristics of a capacitor discharge ciruit.

91. Apparatus for treating a surface of a workpiece member to impart hardness and wear resistance thereto comprising: an electrode member, means for rotating at least one of said members while said members are in contact with each other to provide sliding motion therebetween and an electrical power source connected to said electrode member and for connection thereof to said workpiece member to pass short duration pulses of electrical energy between said electrode member and said workpiece member with resultant intense localized heating of the areas of said workpiece member surface contacted by said electrode, the shape of said electrode member and the motion of said electrode member relative to the workpiece member being such that the size of the contacting area of said electrode member remains substantially constant as said electrode wears.

92. Apparatus as set forth in claim 91 wherein said electric power source comprises a circuit having the characteristics of a capacitor discharge circuit.

93. Apparatus for treating a surface comprising an electrode, means for causing said electrode to traverse said surface, mounting means for said electrode to cause said electrode to contact said surface with a relatively uniform mean contact pressure as said electrode contacts successive portions of said surface, at least a portion of the weight of said mounting means being biased against said surface solely through said electrode, and an electrical circuit for causing passage of short duration pulses of electrical energy between said electrode and said surface during contact therebetween to generate intense localized heating of the contacted portions of said surface.

94. Apparatus as set forth in claim 93 wherein said mounting means includes means for causing said electrode to vibrate.

95. Apparatus as set forth in claim 93 wherein said mounting means includes means for causing said electrode to rotate.

96. Apparatus for treating a surface comprising an electrode, means whereby said electrode is caused to traverse said surface and slidingly contact said surface, means whereby the position of said electrode is changed in response to any changes in the contour of said surface to maintain the mean contact pressure of said electrode on said surface relatively uniform, and a source of electric current having the characteristics of a capacitor discharge for causing electrical discharges between said electrode and said surface to generate intense localized heating of the contacted portions of said surface.

97. Apparatus for treating an electrically conductive workpiece surface comprising a generally tubular shaped hollow electrode adapted to contact the surface, an electrical power source connected to said electrode and said workpiece surface to provide short duration pulses of electrical energy between said electrode and said surface at the region of contact therebetween with resultant localized intense heating of the portions of said surface contacted by said electrode, and means for flowing gas through said hollow electrode against said surface as said electrode contacts said surface.

98. Apparatus for treating an electrically conductive workpiece surface comprising an electrode adapted to contact said surface, means to impart motion to said electrode whereby said electrode slides with respect to said surface, said electrode being connected to said means by a resilient flexible member, and an electrical power source connected to said electrode and said workpiece to cause short duration pulses of electrical energy between said electrode and surface during and at the region of contact therebetween with resultant localized intense heating of the portions of said surface contacted by said electrode.

99. Apparatus for treating the surface of a metal workpiece member comprising an electrode member secured to a movable support whereby said electrode member can move into contact with said surface, means for moving at least one of said members to cause the contacting electrode member to move with respect to said surface in a direction having at least a substantial component parallel to said surface and for imparting additional motion between said members to cause said electrode member to traverse the portions of the surface desired to be treated, said support including means for biasing said electrode member into contact with said surface with a relatively uniform mean contact pressure as said electrode member traverses said surface, and an electrical power source to provide short duration pulses of electrical energy for generating instantaneous electrical discharges between said electrode member and said surface during contact therebetween whereby there is instantaneous localized fusion of the portions of said surface contacted by said electrode.

100. Apparatus for treating the surface of a metal workpiece member comprising an electrode member, means for moving at least one of said members with respect to the other of said members to cause the contacting electrode member to move with respect to said surface in a direction having at least a substantial component parallel to said surface and for imparting additional motion between said members to cause said electrode member to traverse all portions of said surface desired to be treated, means for simultaneously vibrating at least one of said members in a direction generally perpendicular to said surface, support means for said electrode to provide relatively uniform mean contact pressure between said electrode member and said surface as said electrode member traverses said surface, and an electrical power source to provide short duration pulses of electrical energy for generating instantaneous electrical discharges between said electrode member and said surface with resultant localized fusion of the portions of said surface contacted by said electrode.

101. A method for treating a metal surface comprising passing rapid short duration pulses of electrical energy between an electrode and said surface while said electrode is in contact with and in sliding motion on said surface; the pulse energy, the electrode speed and the area and pressure of contact between the electrode and surface being such that luminous discharges occur between said electrode and surface having an intensity to cause instantaneous localized heating of the surface to cause heat treatment thereof without any substantial removal of material from said surface, said electrode motion and discharges being continued until the desired treatment is imparted to said surface.

102. A method as set forth in claim 101 wherein said pulses are triggered by the movement of the electrode with respect to said surface.

103. A method as set forth in claim 101 wherein said pulses are from an electrical energy source which includes switching means for interrupting the flow of electrical energy to said electrode thereby creating said pulses.

104. A method as set forth in claim 101 wherein said electrode is formed of metal carbide.

105. A method as set forth in claim 101 wherein metal carbide powder is placed on said surface and is bonded thereto by said intense heating.

106. A method as set forth in claim 101 wherein said pulses are from a circuit having the characteristics of a capacitor discharge circuit.

107. Apparatus for treating the surface of a metal workpiece to impart hardness and wear resistance thereto comprising a source of rotary power, an electrode having an annular surface connected to said source of rotary power for rotation thereby while the annular surface of said electrode is in tangential contact with said workpiece surface to cause sliding motion therebetween, a source of electric current connected to said electrode and for connection to said workpiece to cause intense localized heating of portions of the area of said workpiece surface tangentially contacted by said rotating electrode without substantial removal of said portions, and means for imparting translatory movement between said rotating electrode and said workpiece surface to cause said tangential contact to move over all portions of said workpiece surface desired to be treated.

108. Apparatus as set forth in claim 107 wherein said source of electric current provides a continuous current.

109. Apparatus as set forth in claim 107 wherein said source of electric current comprises a circuit which provides a high frequency current.

110. Apparatus for treating the surface of a metal workpiece to impart hardness and wear resistance thereto comprising a source of rotary power, an electrode connected to said source of rotary power for rotation thereby about an axis inclined at an angle other than perpendicular to said workpiece surface while a surface of said electrode is in tangential contact with said workpiece surface to cause sliding motion therebetween and a source of electric current connected to said electrode and for connection to said workpiece to cause intense localized heating of portions of the area of said workpiece surface tangentially contacted by said rotating electrode.

111. Apparatus for treating a surface comprising an electrode, means whereby said electrode is caused to repeatedly traverse said surface and slidingly contact said surface, means whereby the position of said electrode is changed in response to any changes in the contour of said surface to maintain the mean contact pressure of said electrode on said surface relatively uniform and means for causing passage of electric current between said electrode and said surface to generate intense localized heating of the contacted portions of said surface.

112. Apparatus for treating a surface comprising an electrode, mounting means mounting said electrode for contact with said surface, means for causing said electrode to traverse said surface in sliding contact therewith, and means for causing passage of electric current between said electrode and said surface during contact therebetween to generate intense localized heat in each portion of the surface contacted, at least a portion of the weight of said mounting means being biased against said surface solely through said electrode whereby the mean contact pressure between said electrode and said surface is maintained relatively uniform as said electrode traverses said surface.

113. Apparatus as set forth in claim 112 wherein said mounting means comprises a resilient member which biases said electrode into contact with said surface.

114. Apparatus as set forth in claim 113 wherein said mounting means includes means for causing said electrode to rotate.

115. Apparatus for treating a surface comprising an electrode, mounting means for said electrode to position said electrode to contact said surface, said mounting means including an arm, said electrode being secured to one end of said arm and said arm being positioned at an angle to a line generally perpendicular to said surface, means for causing said electrode to traverse and slide with respect to said surface, said mounting means including means responsive to any changes in the contour of said surface for maintaining a relatively uniform mean contact pressure between said electrode and said surface as said electrode traverses said surface, and means for causing passage of electric current between said electrode and said surface during contact therebetween to generate localized heating of the contacted portions of said surface.

References Cited by the Examiner

UNITED STATES PATENTS

| | | | |
|---|---|---|---|
| 416,873 | 12/1889 | Tilghman | 219—50 |
| 1,097,895 | 5/1914 | Thomson | 219—87 |
| 1,217,431 | 2/1917 | Foley | 219—60 |
| 1,298,590 | 3/1919 | Smith | 219—124 |
| 1,460,137 | 6/1923 | Myers | 219—76 |
| 1,498,167 | 6/1924 | Hill | 219—124 |
| 1,533,236 | 4/1925 | Dawson | 148—150 X |
| 1,784,015 | 12/1930 | Lane et al. | 219—77 |
| 1,791,968 | 2/1931 | Morgan | 219—77 |
| 1,817,092 | 8/1931 | Mills | 219—76 |
| 1,866,538 | 7/1932 | Andrus | 219—76 X |
| 2,204,545 | 6/1940 | Faunce | 219—130 |
| 2,299,747 | 10/1942 | Harter | 219—76 |
| 2,481,163 | 9/1949 | Setzler | 219—130 |
| 2,485,361 | 10/1949 | Condit et al. | 219—69 |
| 2,490,302 | 12/1949 | Holfelder | 219—69 |
| 2,813,192 | 11/1957 | Brooks et al. | 219—130 |
| 2,844,498 | 7/1958 | Mouravieff | 266—4 X |
| 2,885,534 | 5/1959 | Ter Berg et al. | 219—123 |
| 2,908,801 | 10/1959 | Cresswell | 219—74 |
| 2,923,808 | 2/1960 | Wattles | 219—69 |
| 2,945,936 | 7/1960 | Carman | 219—69 |
| 3,097,291 | 7/1963 | Adcock | 219—76 |
| 3,098,150 | 7/1963 | Inoue | 219—76 X |

FOREIGN PATENTS

| | | |
|---|---|---|
| 9,782 | 1887 | Great Britain. |
| 462,374 | 1937 | Great Britain. |

OTHER REFERENCES

"Working Metals By Electro-Sparking 1956," pp. 37–42.

"Carbide Deposit Ups Tool Life," Eshelman, May 1959, The Iron Age, pp. 152–153.

ANTHONY BARTIS, *Acting Primary Examiner.*

JOSEPH V. TRUHE, *Examiner.*

UNITED STATES PATENT OFFICE

CERTIFICATE OF CORRECTION

Patent No. 3,277,267                                          October 4, 1966

Henry Blaszkowski

It is hereby certified that error appears in the above numbered patent requiring correction and that the said Letters Patent should read as corrected below.

Column 2, line 35, for "causing" read -- cause --; column 3, line 21, for "produre" read -- produce --; line 31, after "region" insert -- of --; line 44, for "any" read -- an --; line 58, for "possession" read -- possessing --; column 4, line 34, for "mecanical" read -- mechanical --; column 7, line 47, for "depositing" read -- deposition --; column 8, line 10, for "funtion" read -- function --; line 36, for "desiable" read -- desirable --; line 53, after "amps" strike out the period; column 22, line 8, for "Alternately" read -- Alternatively --; line 56, after "resistance" insert -- heating --; column 23, line 54, for "or" read -- of --; column 24, line 30, for "surfave" read -- surface --; column 27, line 9, for "electrodes" read -- electrode --; lines 59, 61, 63 and 69, claim reference numeral "21", each occurrence, read -- 31 --.

Signed and sealed this 5th day of September 1967.

(SEAL)
Attest:

ERNEST W. SWIDER                                    EDWARD J. BRENNER
Attesting Officer                                  Commissioner of Patents